US010994629B2

(12) United States Patent
Kim et al.

(10) Patent No.: US 10,994,629 B2
(45) Date of Patent: May 4, 2021

(54) ELECTRIC VEHICLE RESERVATION CHARGING SYSTEM AND METHOD

(71) Applicants: Hyundai Motor Company, Seoul (KR); Kia Motors Corporation, Seoul (KR)

(72) Inventors: Hyun-Sup Kim, Gyeonggi-do (KR); In-Seok Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 277 days.

(21) Appl. No.: 16/213,371

(22) Filed: Dec. 7, 2018

(65) Prior Publication Data

US 2020/0055419 A1 Feb. 20, 2020

(30) Foreign Application Priority Data

Aug. 20, 2018 (KR) .................. 10-2018-0096606

(51) Int. Cl.
*B60L 53/64* (2019.01)
*G06Q 10/02* (2012.01)
*G06Q 50/06* (2012.01)
*B60K 6/22* (2007.10)

(52) U.S. Cl.
CPC .......... *B60L 53/64* (2019.02); *G06Q 10/02* (2013.01); *G06Q 50/06* (2013.01); *B60K 6/22* (2013.01); *B60Y 2200/91* (2013.01); *B60Y 2200/92* (2013.01); *B60Y 2300/91* (2013.01)

(58) Field of Classification Search
USPC ........................................................ 320/109
See application file for complete search history.

(56) References Cited

U.S. PATENT DOCUMENTS

| 2010/0164439 | A1* | 7/2010 | Ido | H02J 7/087 320/155 |
| 2011/0004358 | A1* | 1/2011 | Pollack | B60L 55/00 700/297 |
| 2011/0078092 | A1* | 3/2011 | Kim | B60L 58/16 705/412 |
| 2013/0006461 | A1* | 1/2013 | Kim | B60L 53/65 701/22 |
| 2020/0055419 | A1* | 2/2020 | Kim | B60L 58/12 |

FOREIGN PATENT DOCUMENTS

| KR | 20130032493 A | 4/2013 |
| KR | 20140038796 A | 3/2014 |
| KR | 20150113464 A | 10/2015 |

* cited by examiner

*Primary Examiner* — Mohammed Alam
(74) *Attorney, Agent, or Firm* — Mintz Levin Cohn Ferris Glovsky and Popeo, P.C.; Peter F. Corless

(57) ABSTRACT

An electric vehicle reservation charging system is provided. The system includes a communication controller that receives charging and discharging reservation setting information and power rate information. A vehicle controller determines a preset charging profile based on an entry of a preset minimum cost charging mode using the charging and discharging reservation setting information and the power rate information. A charging state control is performed based on an optimal charging state profile and an optimal charging power profile that are preset based on the charging profile. A charger then perform a power control for charging or discharging to correspond to a target charging discharging power command determined by the charging state control.

15 Claims, 18 Drawing Sheets

$$P_{chg\_cmd}(k) = P^*_{chg}(k) + f(SOC^*_{chg}(k) - SOC_{act}(k))$$

ELECTRIC VEHICLE RESERVATION CHARGING SYSTEM AND METHOD

CROSS-REFERENCE TO RELATED APPLICATION

This application claims priority to Korean Patent Application No. 10-2018-0096606 filed on Aug. 20, 2018, which is incorporated herein by reference in its entirety.

BACKGROUND

Field of the Disclosure

The present disclosure relates to an electric vehicle reservation charging technique, and more particularly, to an electric vehicle reservation charging system and method, which calculate optimal charging power capable of minimizing a charging fee by hour during the entire charging sections before the charging, and then charge the vehicle battery based on the above using the inputs of electric fee information by hour, a driver's charging hour, and a target charging amount.

Description of Related Art

Recently, environmental and energy resource concerns are increasing, and an electric vehicle for solving such concerns is being developed as a future transportation. The electric vehicle includes an electric vehicle, a plug-in hybrid vehicle, etc. These vehicles required a charged battery for operation, and for this purpose, the battery may be charged at home or at a charging station. When performing slow charging at a home charging facility, it takes about 5 hours or more to charge to a state of charge (SOC) of 90% or more.

Meanwhile, when such a vehicle is used for commuting, the pattern of traveling in the morning and charging in the evening adversely affects the power grid or the distributed power source in a certain hour zone, and increases the entire maximum consumed amount of the power grid. This is the amount that is matched to the maximum power consumed amount, and when more power is used, the current power system having a reserve ratio of about 10% requires additional power generation facilities and a substantial amount of electricity is wasted, thus reducing the energy efficiency thereof. In addition, a general electric fee varies by the hour zone, and thus, even if the same amount of electric energy is charged, the total electric charging fee may vary based on the charging method.

Accordingly, methods for minimizing the charging fee have been proposed. A method for saving the charging cost by the charging condition input (e.g., a use hour setting, a charging electric amount setting, and a charging operation division setting) of the user, a method for performing a charging control by selecting the hour zone having a low electric fee considering the charging fee for each hour zone, a method for dividing the cases based on at which timing in the charging hour zone the expected completion timing is located and the difference between the fees for each hour zone, a method for determining the charging between the distributed power source and the commercial power source and performing the shift of the charging vehicle to the hour zone that the unused power is the greatest, etc. have been considered.

However, even in these methods, there are problems in that the user has to set a separate charging condition to save the fee, or is closely related to the use of the power source (solar, wind, thermal power, etc.) of the grid, or to consider the charging fee for each hour zone, the amount of calculation is excessively large for finding all cases, or the shift of the charging hour, rapid and slow certain power charging, etc. are required. Accordingly, a charging strategy for minimizing the entire charging fee is required when charging the battery.

The contents described in this section are to merely the understanding of the background of the present disclosure, and may include what is not previously known to those skilled in the art to which the present disclosure pertains.

SUMMARY

The present disclosure provides an electric vehicle reservation charging system and method, may charge a battery at a minimal cost even without the setting of the additional charging conditions by the user to save the fee.

In addition, the present disclosure provides an electric vehicle reservation charging system and method, which may perform the optimization of the charging fee in the vehicle using the information of electric fee for each hour zone regardless of the use of the power source of the power grid. Another object of the present disclosure is to provide an electric vehicle reservation charging system and method, which may reduce calculation hour by applying the algorithm of dynamic programming, thus optimizing the entire region even at the calculation level of an engine control unit (ECU) of the vehicle. Yet another object of the present disclosure is to provide an electric vehicle reservation charging system and method, which may charge at a variable optimal charging power for each hour, rather than the shift of the charging hour or the rapid or slow certain power charging.

In order to achieve the objects, the present disclosure provides an electric vehicle reservation charging system for calculating an optimal charging power capable of minimizing a charging fee during the entire charging section by hour before the charging, and then charging the battery of a vehicle based on the above using the inputs of power rate information by hour, a driver's charging hour, and a target charging amount.

An electric vehicle reservation charging system may include a communication controller configured to receive charging and discharging reservation setting information and power rate information; a vehicle controller configured to determine a preset charging profile based on the entry of a preset minimum cost charging mode using the charging discharging reservation setting information and the power rate information, and perform a charging state control based on an optimal charging state profile and an optimal charging power profile that are preset based on the charging profile; and a charger configured to perform a power control for charging or discharging to correspond to a target charging discharging power command determined by the charging state control.

In addition, the charging profile may be a first charging profile that is preset based on the entry of the preset minimum cost charging mode or a second charging profile determined using a preset dynamic programming method when there is no the first charging profile. The charging reservation setting information may include a target charging amount, a reservation charging completion hour, and a charging mode. The power control may adjust a voltage and a current to correspond to a target power command determined through the optimal charging state profile and the optimal charging power profile.

Further, the optimal charging power profile is a map that indicates the relationship between the hour and the power, and the optimal charging state profile is a map that indicates the relationship between the hour and the charging state. The first charging profile may perform a user condition charging control set by the user or a general charging control when it is not the entry of the minimum cost charging mode. The vehicle controller may be configured to determine the charging profile again when the power rate information is changed while the power control executes.

The second charging profile may be generated using a power rate map including a rate for the power amount for each hour zone based on the power rate information, charging constraint condition information composed of a start charging state, a target charging state, a charging start hour, a charging completion hour, and a system maximum charging power based on the power rate map, and a power search grid information generated to satisfy the charging constraint condition information and generating a grid at an arbitrary interval of the start charging state and the target charging state, an arbitrary interval of the charging start hour and the charging completion hour, and an arbitrary interval of the system maximum charging and 0 kw.

In addition, the second charging profile may be generated using a power rate map including a rate for the power amount for each hour zone based on the power rate information, charging constraint condition information composed of a start charging state, a target charging state, a charging start hour, a charging completion hour, and a system maximum charging power based on the power rate map, and a power search grid information generated to satisfy the charging constraint condition information and generating a grid at an arbitrary interval of the start charging state and the target charging state, an arbitrary interval of the charging start hour and the charging completion hour, and an arbitrary interval of the system maximum charging and the system maximum discharging.

The system maximum charging power reflects the characteristic of at least one of a battery, a charging device, and a charger. In addition, the second charging profile may generate an intermediate map by calculating each hour and a charging cost in the charging state in a backward method from the last hour, and may be calculated in a forward method using the intermediate map. The second charging profile may be acquired using the intermediate map stored for each grid in each charging state that is acquired in a backward method from the last hour.

According to another exemplary embodiment of the present disclosure an electric vehicle reservation charging system may include a communication controller configured to receive charging and discharging reservation setting information and power rate information; a vehicle controller configured to determine a preset charging profile based on the entry of a preset minimum cost charging mode using the charging discharging reservation setting information and the power rate information, and generate the charging profile; and a charger configured to perform a charging state control based on an optimal charging state profile and an optimal charging power profile that are preset based on the charging profile, and perform a power control for charging and discharging to correspond to a target charging discharging power command determined by the charging state control.

According to yet another exemplary embodiment of the present disclosure an electric vehicle reservation charging method may include receiving charging and discharging reservation setting information and power rate information by a communication controller; determining a preset charging profile based on the entry of a preset minimum cost charging mode using the charging discharging reservation setting information and the power rate information, and performing a charging state control based on an optimal charging state profile and an optimal charging power profile that are preset based on the charging profile by a vehicle controller; and performing a power control for charging or discharging to correspond to a target charging discharging power command determined by the charging state control by a charger.

According to still another exemplary embodiment of the present disclosure an electric vehicle reservation charging method may include receiving charging discharging reservation setting information and power rate information by a communication controller; determining a preset charging profile based on the entry of a preset minimum cost charging mode using the charging discharging reservation setting information and the power rate information, and generating the charging profile by a vehicle controller; and performing a charging state control based on an optimal charging state profile and an optimal charging power profile that are preset based on the charging profile, and performing a power control for charging or discharging to correspond to a target charging discharging power command determined by the charging state control by a charger.

According to the present disclosure, it may be possible to charge a vehicle battery at a minimal cost even without the setting of additional charging conditions by the user to save the associated fee. In addition, it may be possible to perform the optimization of the charging fee in the vehicle using the information of the electric fee for each hour zone regardless of the use of the power source of the power grid. It may also be possible to reduce the calculation hour by applying the algorithm of dynamic programming, thus optimizing the entire region even at the calculation level of an engine control unit (ECU) of the vehicle. In addition, it may be possible to charge at a variable optimal charging power for each hour, rather than the shift of the charging hour or the rapid or slow certain power charging.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Figure 1:
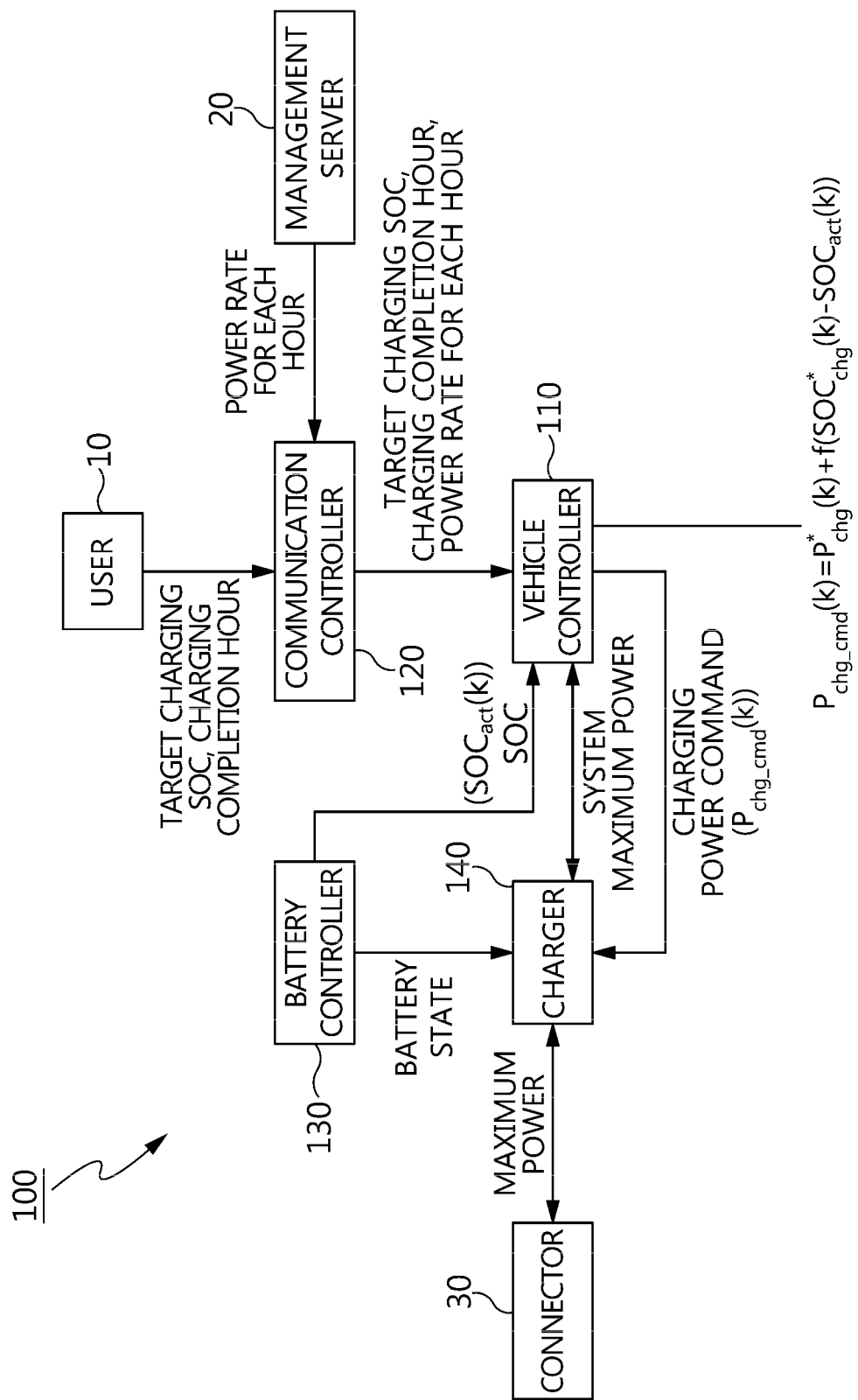
FIG. 1 is a block diagram of an electric vehicle reservation charging system in accordance with an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Various modifications and various exemplary embodiments may be made in the present disclosure, so that specific exemplary embodiments are illustrated in the drawings and described in detail in the specification. It should be understood, however, that it is not intended to limit the present disclosure to the particular disclosed forms, but includes all modifications, equivalents, and alternatives falling within the sprit and technical scope of the present disclosure.

Like reference numerals are used for like elements in describing each drawing. The terms "first," "second," and the like can be used to illustrate various components, but the components should not be limited by the terms. The terms are used only to differentiate one component from another component. For example, a first component may be referred to as a second component, and similarly, the second component may be also referred to as the first component without departing from the scope of the present disclosure. It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the application.

Hereinafter, an electric vehicle reservation charging system and method in accordance with an exemplary embodiment of the present disclosure will be described in detail with reference to the accompanying drawings. FIG. 1 is a block diagram of an electric vehicle reservation charging system 100 in accordance with an exemplary embodiment of the present disclosure. Referring to FIG. 1, an electric vehicle reservation charging system 100 may include a vehicle controller 110, a communication controller 120, a battery controller 130, a charger 140, etc.

The communication controller 120 may be configured to receive charging reservation setting information and/or power rate information to transmit the information to the vehicle controller 110. The charging reservation setting information may be generated by the user 10, and the charging reservation setting information may include a target charging amount, a reservation charging completion hour, a charging mode, etc. The power rate information may be transmitted from a management server 20. The target charging amount may be described using a state of charge (SOC), but is not limited thereto and may also use a state of health (SOH), a depth of discharging (DOD), a state of function (SOF), etc.

The management server 20 may be connected with a power grid (not illustrated), and may be configured to provide rate information regarding the amount of power used. The management server 20 may also be configured to calculate the rate for the total electric amount used for charging through the electric supply unit (not illustrated), and charge the rate to the electric vehicle owner. For this purpose, the management server 20 may include electric vehicle information, user information, rate information, etc. as a database.

The communication controller 120 may be integrally composed of an audio-video-navigation (AVN), a telematics unit (TMU), etc., and may be configured as a standalone, respectively. In addition, the AVN may be a communication terminal such as a smart phone, a note pad, etc. The vehicle controller 110 may be configured to determine a preset charging profile based on the entry or input of a preset minimum cost charging mode using the charging reservation setting information and the power rate information, and may be configured to generate a charging power command corresponding to the charging profile.

The battery controller 130 may be configured to optimize the battery management of the vehicle, thus enhancing energy efficiency and extending the life span of the battery. The battery controller 130 may also be configured to monitor a battery voltage, a current, and a temperature in real time and prevent excessive charging and discharging in advance, thus enhancing battery safety and reliability. Particularly, the battery controller 130 may be configured to detect the battery state in the charger 140, and transmit the SOC information based on the battery state to the vehicle controller 110.

The charger 140 may be configured to receive maximum power information and power from a connector 30 of the charging station (not illustrated) to supply the charging power to the battery (not illustrated) based on the charging power command of the vehicle controller 110. In addition, the charger 140 may include the maximum power information delivered from the connector to provide the vehicle controller 110 with the entire system maximum power information that may be charged.

Figure 2:
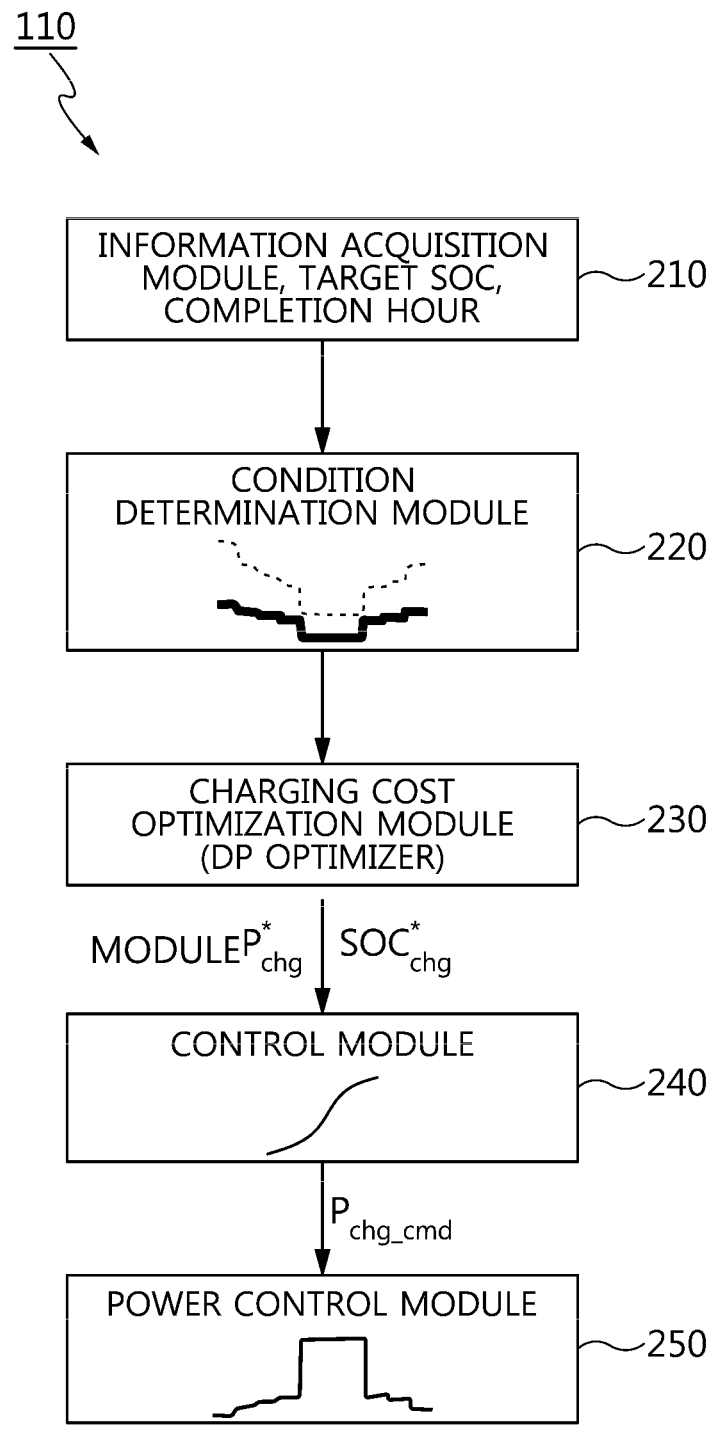
FIG. 2 is a detailed block diagram of a vehicle controller illustrated in FIG. 1 in accordance with an exemplary embodiment of the present disclosure.

FIG. 2 is a detailed block diagram of the vehicle controller 110 illustrated in FIG. 1. Referring to FIG. 2, the vehicle controller 110 may include an information acquisition module 210 configured to acquire the charging reservation setting information and the power rate information, a condition determination module 220 configured to determine a first charging profile that is preset based on the entry or input of the preset minimum cost charging mode, a charging cost optimization module 230 configured to determine a second charging profile by optimizing charging cost using preset dynamic programming (DP) when there is no determined first charging profile, a control module 240 configured to perform a charging control based on the first charging profile or the second charging profile, a power control module 250 configured to transmit a charging power command to the charger based on the charging control, etc.

Herein, the minimum cost charging mode refers to the charging control for minimizing the total charging power rate upon charging the battery. In addition, the dynamic program is an optimization technique for searching for a control variable for minimizing the defined cost in a backward method by a 'Principle of Bellman' to find a minimum solution of all cases.

The charging cost optimization module 230 performs the DP optimization to minimize the charging fee and then performs the charging control while satisfying the reservation charging completion hour and the target charging amount. In FIG. 2, the charging cost optimization is as follows.

$$J = \sum_{k=0}^{N-1} P_{chg}(k) \times C_{chg}(k), \; 0 < P_{chg}(k) < P_{chg\_MAX}(k) \quad \text{Equation 1}$$

wherein, the J refers to the total charging cost, the $P_{chg}$ to the charging power, the $C_{chg}$ to the charging cost, the $P_{chg\_MAX}$ to the maximum charging power, and k to 0 ... N−1.

$$P_{bat}(k) = P_{chg}(k) \times n_{eff}(k) \quad \text{Equation 2}$$

wherein, the $P_{bat}$ refers to the battery input power, and the $\eta_{eff}$ to the charging efficiency.

The SOC control is as follows.

$$P_{chg\_cmd}(k) = P^*_{chg}(k) + f(SOC^*_{chg}(k) - SOC_{act}(k)) \quad \text{Equation 3}$$

wherein, the $P_{chg\_cmd}$ refers to the power command, the $P^*_{chg}(k)$ to the optimal power profile, and the $SOC_{chg}(k)$ to the optimal SOC profile. The $SOC_{act}(k)$ refers to a current actual SOC profile, and the f to a function for outputting a difference between two values. The power control is a voltage/current control for following the power command $P_{chg\_cmd}(k)$.

The above equations represent the charging only from the grid to the vehicle (grid→vehicle). Accordingly, when the charging from the vehicle to the grid (vehicle→grid) is included, the equation is as follows.

$$J = \sum_{k=0}^{N-1} P_{chg}(k) \times C_{chg}(k), \quad \text{Equation 4}$$

$$P_{dischg\_MAX}(k) < P_{chg}(k) < P_{chg\_MAX}(k)$$

wherein, the $P_{dischg\_MAX}$ refers to the maximum discharging power. Accordingly, only in the grid→vehicle, the range of the $P_{chg}$ is limited only to the system maximum charging power. In contrast, in the vehicle→grid, the range of $P_{chg}$ is limited to the system maximum charging power $P_{chg\_MAX}$ and the maximum discharging power $P_{dischg\_MAX}$, and the system efficiency equation is divided by two depending upon the charging and discharging situations. This can be expressed by the following equation.

$$P_{bat}(k) = P_{chg}(k) \times \eta_{chgeff}(k), \text{ if charging}$$

$$P_{chg}(k) = P_{bat}(k) \times \eta_{dischgeff}(k), \text{ if discharging} \quad \text{Equation 5}$$

wherein, the $\eta_{chgeff}$ refers to charging efficiency, and the $\eta_{dischgeff}$ to discharging efficiency.

Figure 3:
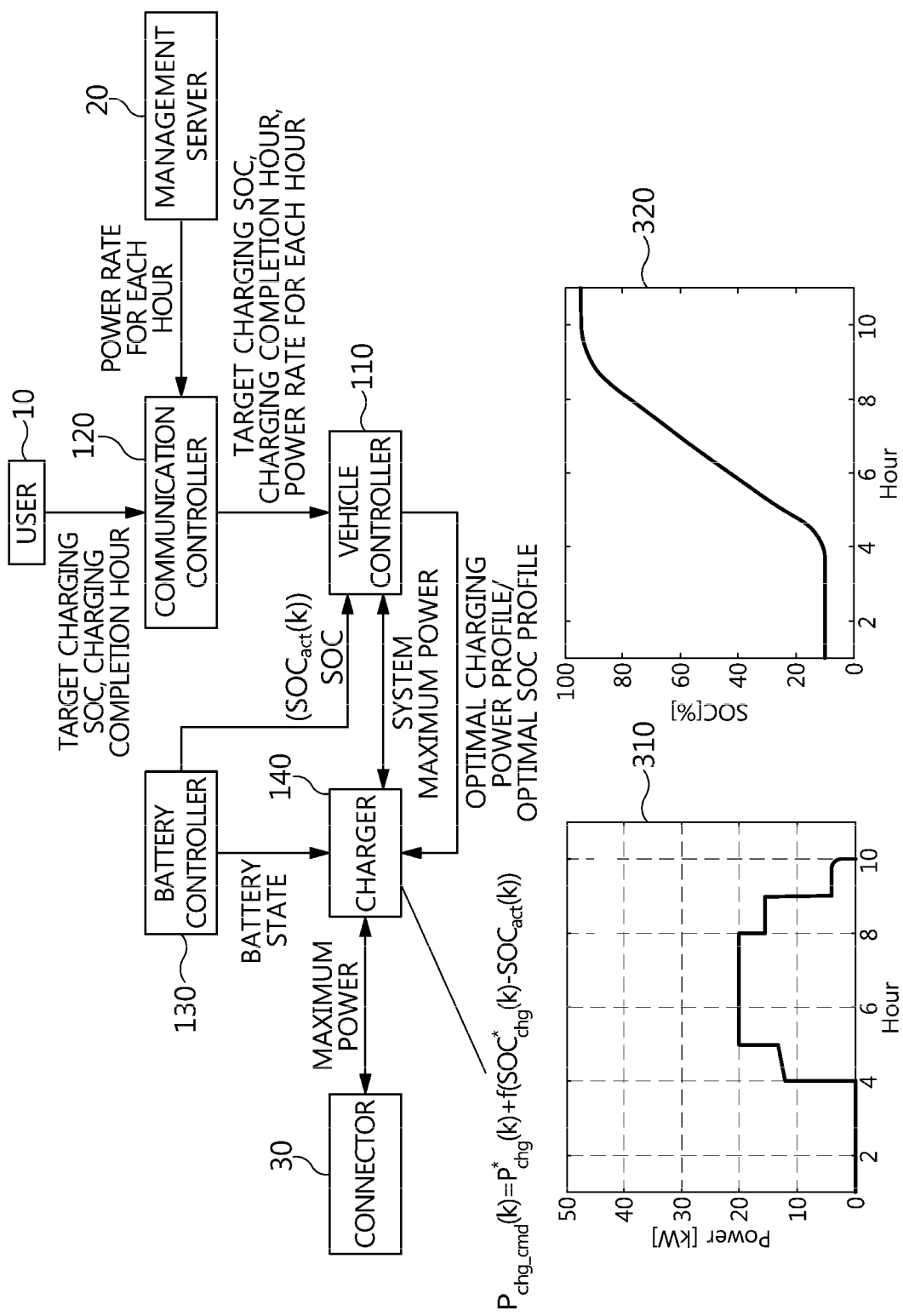
FIG. 3 is a block diagram of an electric vehicle reservation charging system in accordance with another exemplary embodiment of the present disclosure.

FIG. 3 is a block diagram of an electric vehicle reservation charging system in accordance with another exemplary embodiment of the present disclosure. In FIG. 3, unlike in FIG. 1, a charging state control (e.g., a SOC control) and a power control are performed at the charger 140 side. In other words, in FIG. 1, the charging cost optimization and the SOC control may be performed at the vehicle controller 110 side, and the power control may be performed at the charger 140 side. In contrast, in FIG. 3, only the charging cost optimization may be performed at the vehicle controller 110 side, and the SOC control and the power control may be performed at the charger 140 side. Referring to FIG. 3, the charger 140 side may be configured to perform the charging state control and the power control using an optimal charging power map 310 and an optimal SOC map 320.

The optimal charging power map 310 is a map that indicates the relationship between the hour and the power, and the optimal state map 320 is a map that indicates the relationship between the hour and the charging state (e.g., the SOC). As described above, the charging state has been described by the SOC in an exemplary embodiment of the present disclosure, but it may be also a state of health (SOH), a depth of discharging (DOD), a state of function (SOF), etc.

In other words, FIGS. 1 and 3 are examples of a cooperated control configuration depending upon the performing subject of a SOC control, for example. FIG. 1 transmits an optimal charging power command to the charger 140 during actual charging after the optimization calculation since the vehicle controller 110 performs the SOC control. On the other hand, FIG. 3 transmits the optimal charging power map and optimal SOC map for each hour to the charger after the optimization calculation since the charger 140 performs the SOC control, and the charger performs the SOC control and the power control during the actual charging cycle to charge the battery.

Figure 4A:
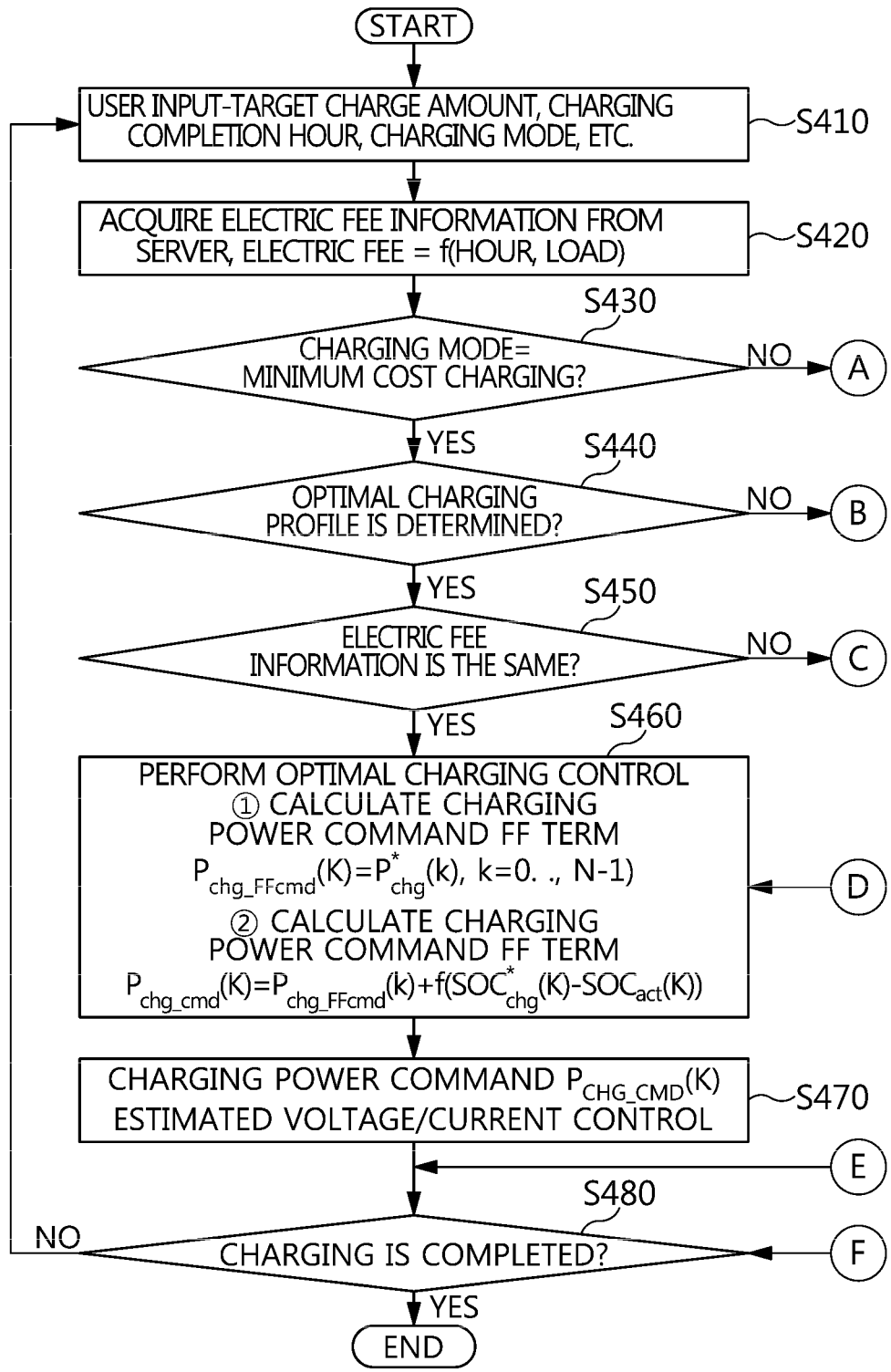
FIGS. 4A and 4B are a flowchart illustrating a minimum cost reservation charging control procedure in accordance with an exemplary embodiment of the present disclosure.
Figure 4B:
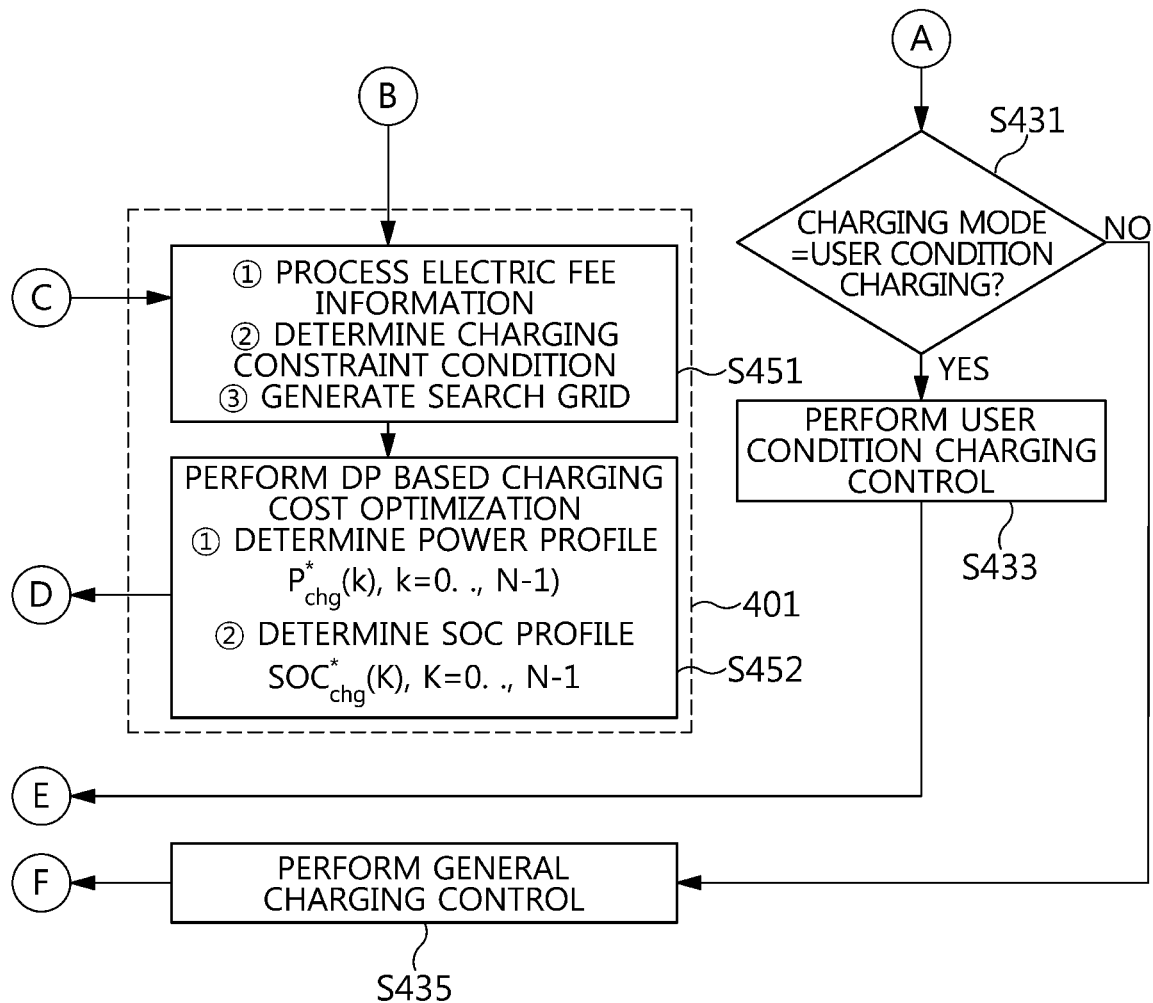

FIGS. 4A and 4B are a flowchart illustrating a minimum cost reservation charging control procedure in accordance with an exemplary embodiment of the present disclosure. Referring to FIGS. 4A-4B, a user of the electric vehicle inputs the charging reservation setting information (e.g., a target charging amount, a reservation charging completion hour, a charging mode, etc.) to the vehicle through the communication controller 120 for the charging. The input information may be transmitted to the vehicle controller 110 S410.

The vehicle controller 110 may then be configured to input the power rate information per unit hour for each hour from the communication controller 120 to the vehicle by communication with the management server 20 through the communication controller 120. The input information may be transmitted to the vehicle controller 110 S420. The power rate (i.e., the electric fee) is a function of the hour and the load. Then, the vehicle controller 110 may be configured to confirm whether the charging mode is the minimum cost charging mode (or the smart charging mode) S430. The smart charging mode directly adjusts the charging hour and amount in a power source (e.g., a charging station).

In the S430, the vehicle controller 110 may be configured to confirm whether to determine the optimum charging profile when the charging mode is the minimum cost charging mode S440. In other words, the charger 140 may be configured to confirm information such as a power, a current, and a voltage (maximum, rated) that may be transmitted to the vehicle by an external power source (e.g., a charging station), and then may be configured to transmit this information to the vehicle controller 110. The vehicle controller 110 considers the allowable maximum power/voltage/current information of the system, and may be configured to perform the optimization calculation to minimize the total power rate while enabling the target charging amount for the battery (not illustrated) within the reservation charging completion hour to calculate the optimal charging power and charging profile for each hour.

In the S440, when the charging profile is not calculated, the optimization performing block 401 may be executed. In the optimization performing block 401, the input information may be converted into the format for performing the optimization calculation (e.g., electric fee information processing, charging constraint condition determination, and search grid generation) S451, and the charging profile that is the optimization calculation result may be generated by performing the dynamic programming based charging cost optimization calculation S452. The charging profile may include a power profile and a charging state profile (e.g., a SOC profile) which becomes the optimal profile by hour upon entering the minimum cost charging mode.

The optimal power profile and charging state profile information for each hour obtained as a result of performing the optimization performing block 401 may be used in performing the optimal charging control S460. Meanwhile, in the S440, when the charging profile is calculated, whether the charging profile is the same as the power rate information (i.e., the electric fee information) received from the management server 20 may be determined in FIG. 1 S540. As a result of confirmation, when the power rate information and the charging profile are not the same, the process may proceed to S451.

In contrast, in the S440, when the charging profile and the power rate information are the same, the charging state control may be performed S460. The charging power commands $P_{chg\_FFcmd}$ and $P_{chg\_cmd}$ may be calculated by the charging power command Forward Forward (FF) term calculation or the charging power command Forward Forward (FF)+Forward Backward (FB) term calculation.

Herein, an example of f ( ) is a Proportional Integral Derivation Control (PID). In addition, the optimum charging power and the optimal SOC are the result of the optimization calculation, and the estimated value of the actual SOC may be used. In other words, the optimal charging power information for each hour may be used as a Feedforward control term for following the optimal SOC. Then, the difference between the target SOC information and the actual SOC may be used as a Feedback control term. The charging power command=the optimum charging power+f (the optimum SOC−the actual SOC).

When the battery is charged with the thus obtained charging power command for each hour, the optimum SOC obtained by the optimization calculation procedure may be followed. In the present disclosure, this is referred to as the charging state control (e.g., the SOC control). Then, a detailed control of the voltage/current of the power electronic device may be performed so that the charger 140 in FIG. 1 follows the charging power command S470. Meanwhile, in the S430, when it is not the minimum cost charging mode, the vehicle controller 110 may be configured to confirm whether the charging mode is the user condition charging mode S431. As a result of confirmation, when a charging mode is the user condition charging mode in the S431, the user condition charging control may be performed, and when it is not the user condition charging mode, the general charging control may be performed S433 and S435. Then, the vehicle controller 110 may be configured to confirm completion of charging S480. In other words, when the power rate information is partially changed during the battery charging control, the S420 to S480 may be executed again.

Figure 5A:
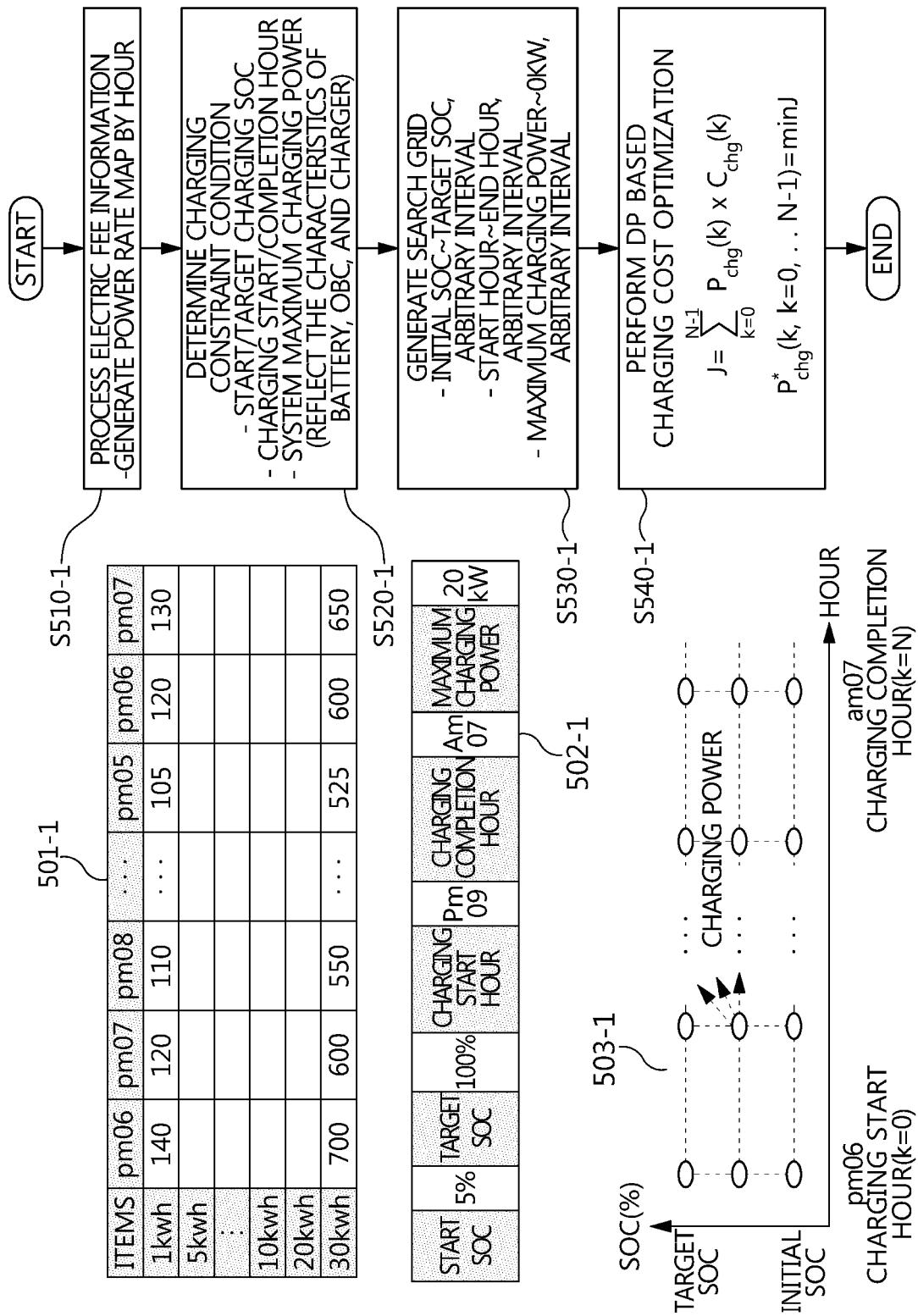
FIG. 5A is a flowchart illustrating the optimization procedure in the optimization performing block illustrated in FIG. 4 to optimize the charging cost of a grid-vehicle in accordance with an exemplary embodiment of the present disclosure.

FIG. 5A is a flowchart illustrating the optimization procedure in the optimization performing block 401 illustrated in FIGS. 4A-4B for the charging cost optimization of grid-vehicle only. In other words, FIG. 5A illustrates the charging cost optimization procedure only for grid→vehicle. Referring to FIG. 5A, the vehicle controller 110 may be configured to process the power rate information S510-1. In other words, the vehicle controller 110 may be configured to generate a power rate map 501-1 by hour. The power rate map 501-1 may include the fee for power amount for each hour. The power rate of 1 kwh during PM 06~07 o'clock means 140, and it means 110 during PM 08~09 o'clock. Then, when using 30 kwh during PM 06~07 o'clock, the rate means 700.

Then, the vehicle controller 110 may be configured to determine a charging constraint condition based on the power rate map 501-1 S520-1. In other words, the table 502-1 may be generated in the charging constraint condition. The power rate map 501 may include a start/target charging SOC, a charging start/completion hour, a system maximum charging power, etc. The start/target charging, the charging start/completion hour, and the maximum charging power information of the system (e.g., a battery, a charger, and a charging device) may be received and stored therein. The system maximum charging power reflects the characteristics of the battery and charger. Then, the vehicle controller 110 may be configured to generate search grid information satisfying the charging constraint condition S530-1. The search grid information 503-1 may include an initial SOC~a target SOC, an arbitrary interval, a start hour~an end hour, an arbitrary interval, a maximum charging power~0 kw, an arbitrary interval, etc.

The search grid information 503-1 illustrates that the SOC grid is formed at the arbitrary interval from the initial SOC to the target SOC, and the charging power grid is formed by dividing the charging power 0 to the maximum charging power at the arbitrary interval for each SOC case. When the number of the SOC intervals is M, the number of hour intervals is N+1, and the number of charging power intervals is L, then the total number of grid formed is eventually M×(N+1)×L. Then, the vehicle controller 110 may be configured to perform dynamic programming (DP) based charging cost optimization S540-1. Herein, the J refers to the charging cost and the min to the minimum function.

Figure 5B:
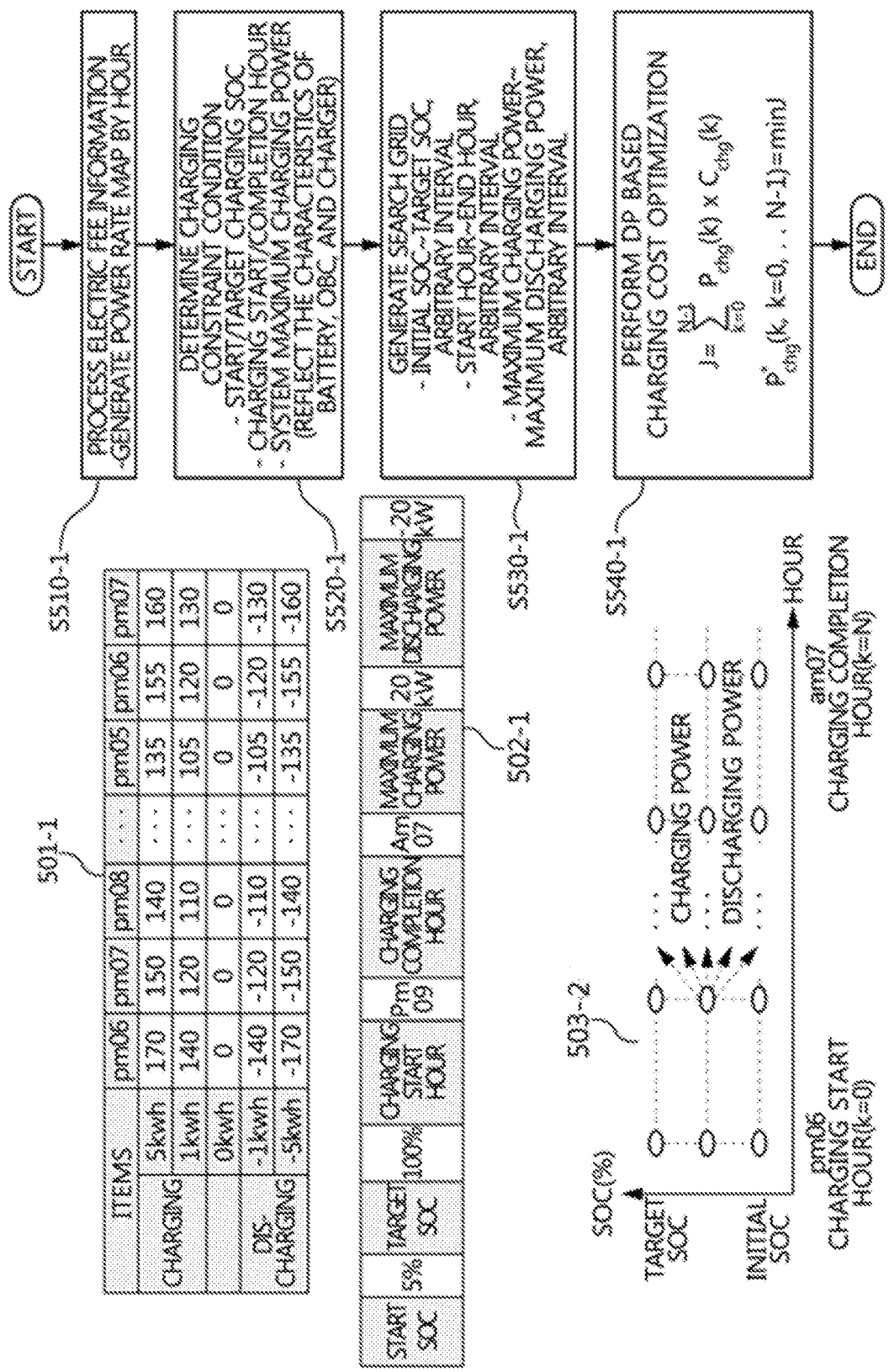
FIG. 5B is a flowchart illustrating the optimization procedure in the optimization performing block illustrated in FIG. 4 to optimize the charging cost including a vehicle-grid in accordance with an exemplary embodiment of the present disclosure.

FIG. 5B is a flowchart illustrating the optimization procedure in the optimization performing block 401 illustrated in FIG. 4 for the charging cost optimization including the vehicle-grid. In other words, FIG. 5B is a flowchart for performing charging cost optimization including both the vehicle→gird and the grid→vehicle. Referring to FIG. 5B, the vehicle controller 110 may be configured to process power rate information S510-2. In other words, the vehicle controller 110 may be configured to generate the power charging map 501-2 by hour. The power rate map 501-2 may include the rate for the power amount for each hour with respect to charging and discharging. In the charging, the power may be supplied from the grid to the vehicle, and in the discharging, the power may be supplied from the vehicle to the grid. Accordingly, when the power is less than 0 kwh, the power may be transmitted to the grid to obtain a gain.

Further, the vehicle controller 110 may be configured to determine the charging/discharging constraint condition based on the power rate map 501-2 S520-2. In other words, the table 502-2 may be generated in the charging/discharging constraint condition. The power rate map 501-2 may include the start/target SOC, the charging start/completion hour, the maximum charging power, the maximum discharging power, etc. The system maximum charging power reflects the characteristics of the battery and charger.

Additionally, the vehicle controller 110 may be configured to generate search grid information satisfying the charging/discharging constraint condition S530-2. The search grid information 503-2 may include the initial SOC~the target SOC, an arbitrary interval, the start hour~the end hour, an arbitrary interval, the maximum charging power~the maximum discharging power, an arbitrary interval, etc. Then, the vehicle controller 110 may be configured to perform dynamic programming (DP) based charging cost optimization S540-2.

Figure 6:
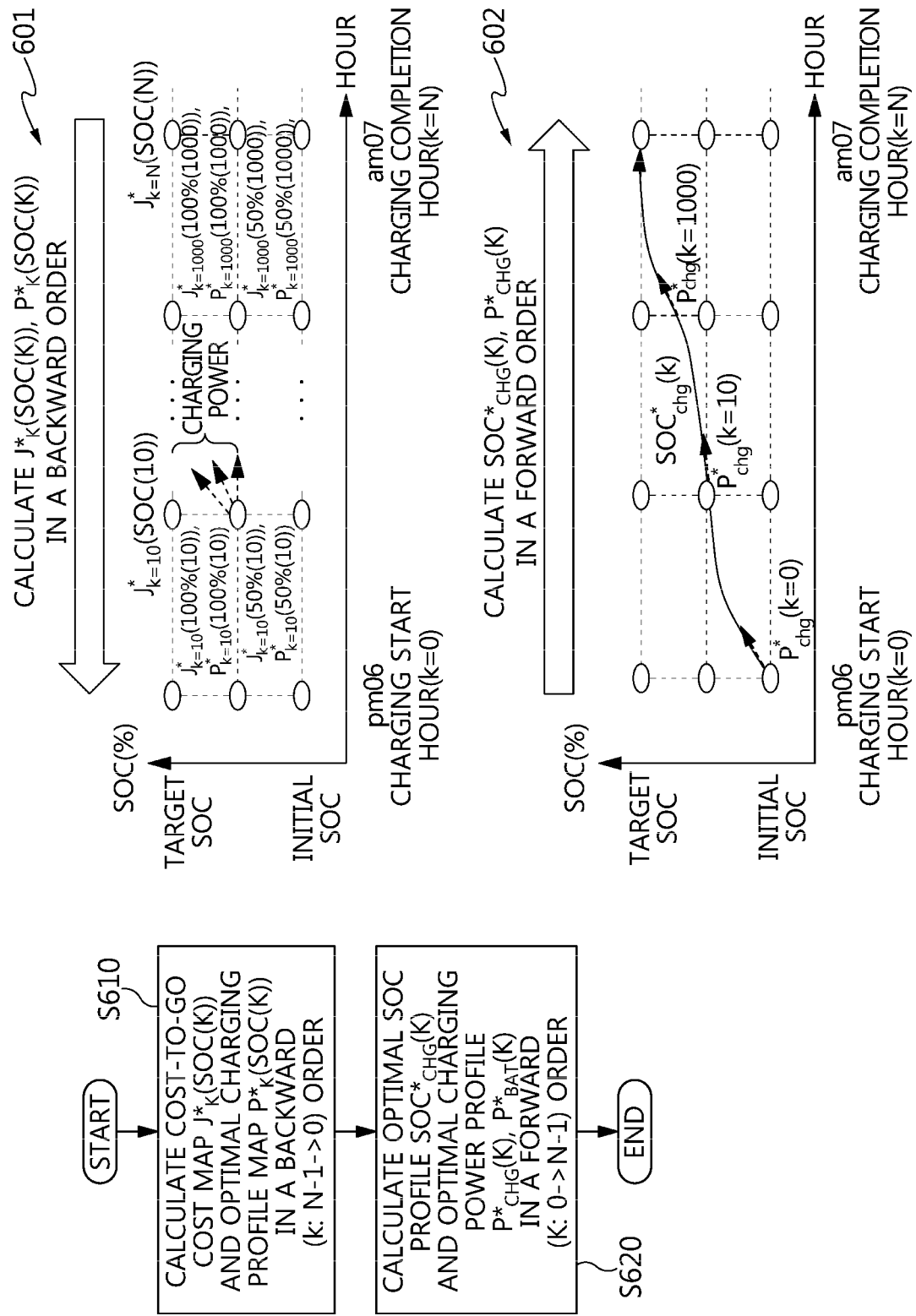
FIG. 6 is a flowchart illustrating a Dynamic Programmable (DP) based optimization procedure in FIG. 5 in accordance with an exemplary embodiment of the present disclosure.

FIG. 6 is a flowchart illustrating the dynamic programming (DP) based optimization procedure illustrated in FIG. 5 S540. Referring to FIG. 6, a backward calculation may first be performed S610. In this backward calculation concept 601, a cost-to-go map indicating a total consumed cost when traveling from a specific hour k and a specific SOC to the target SOC and the maximum charging power map indicating the charging power at the specific hour k and the specific SOC may be derived. Then, a forward calculation may be performed S620. In this forward calculation concept 602, when an initial (k=0) SOC is input into the optimal charging power map, an optimal charging power profile and an optimal SOC profile for the entire hour (k=0 to N) may be obtained.

Figure 7:
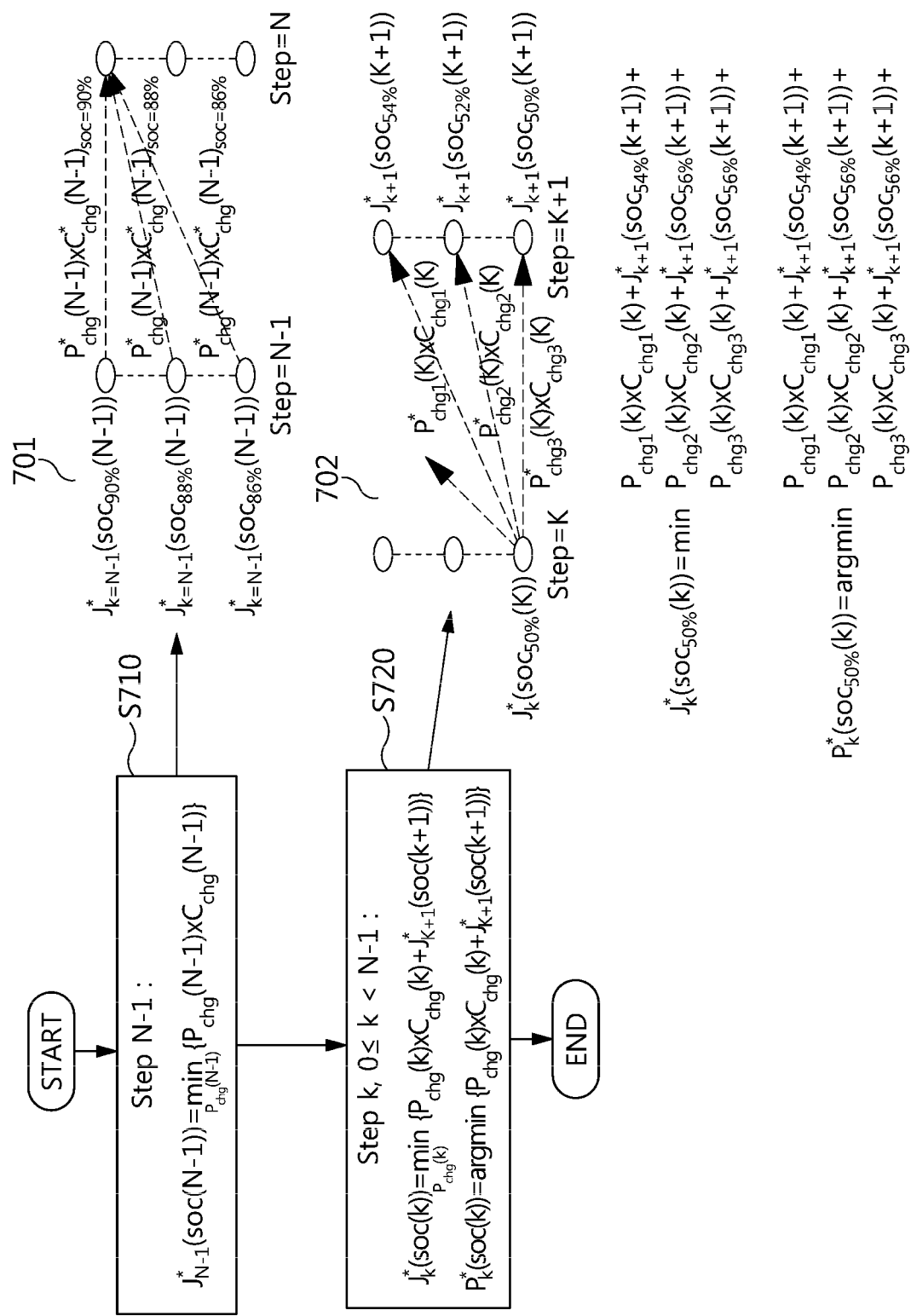
FIG. 7 is a flowchart illustrating the detailed procedure in the S610 illustrated in FIG. 6 in accordance with an exemplary embodiment of the present disclosure.

FIG. 7 is a flowchart illustrating a detailed procedure of the S610 illustrated in FIG. 6. Referring to FIG. 7, at Step N−1, the minimum cost of the charging costs consumed from each SOC grid to the final target SOC (a value or a range) Step N and the charging power at that time are stored in the respective SOC grids (e.g., SOC 90%, 88%, 86%, etc.) S710. In the Step N−1→Step N section, the minimum cost charging power calculation concept 701 is illustrated.

In Step k, in k≤0<N−1: in Step N−2 that the Step k is k=N−2, the minimum cost of the cost adding the charging cost consumed from each SOC grid to the Step N−1 and the charging cost (cost-to-go cost) in the SOC reaching at that time and the charging power at that time may be stored in the respective SOC grids S720. In Step k, the 0 to N−2 section, the minimum cost charging power calculation concept 702 is illustrated. The minimum cost charging power calculation concept 702 is an example of the SOC 50%.

A method for investigating all cases to search for the minimum cost is the most basic global optimization method, but when the charging hour setting is long or the power rate is subdivided, the calculation amount is excessive and thereby server-level computing power is required. Accordingly, to overcome such a disadvantage, the dynamic programming method for calculating the Bellman equation from the last hour in the backward method is applied to the reservation charging control.

In performing the backward calculation, the charging cost for each hour and each SOC may be calculated and mapped. In addition, the optimal charging/the SOC profile may be calculated by performing the forward calculation using the map obtained by performing the backward calculation.

Figure 8:
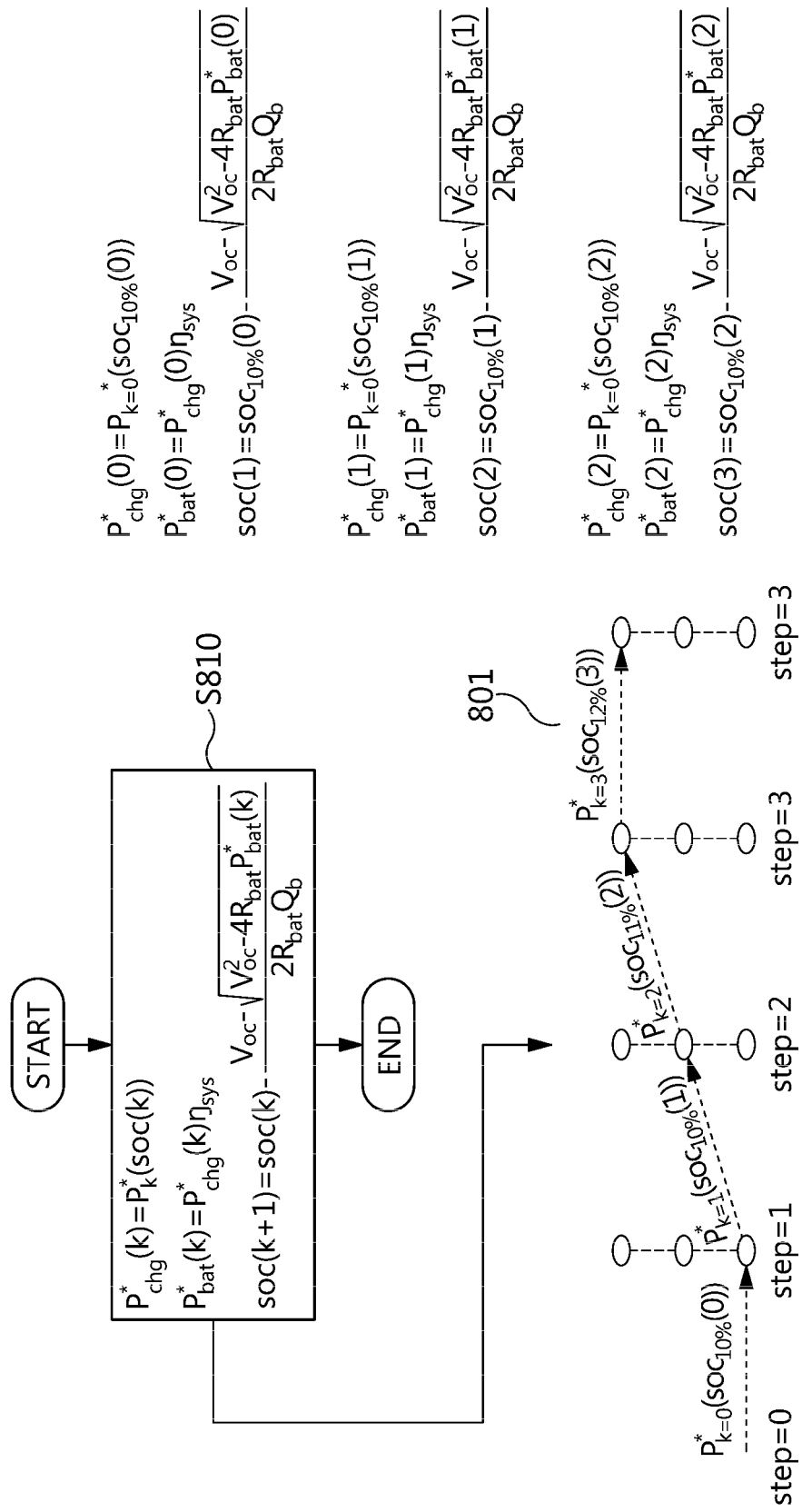
FIG. 8 is a flowchart illustrating the detailed procedure in the S620 illustrated in FIG. 6 in accordance with an exemplary embodiment of the present disclosure.

In FIG. 7, arg min ( ) is a function for obtaining a k value that minimizes a function ($P_{chg}$ (k), etc.). FIG. 8 is a flowchart illustrating a detailed procedure of the S620 illustrated in FIG. 6. Referring to FIG. 8, the minimum cost charging power profile during the Step 0→Step N section may be calculated S810. A forward calculation performing concept 801 is illustrated. The optimum charging power and the SOC profile may be obtained using the optimum charging power map stored for each SOC grid in the Step k obtained by performing the backward calculation. Since the SOC at the Step k=0 is the charging start SOC, for example, when it is 10%, Step k=1, 2, 3 may be sequentially performed and the SOC may be increased. Herein, the $\eta_{sys}$ refers to the system efficiency, the $R_{bat}$ to the battery resistance, the $V_{oc}$ to the opened voltage of the battery, and the Qb to the charge amount of a battery.

Figure 9A:
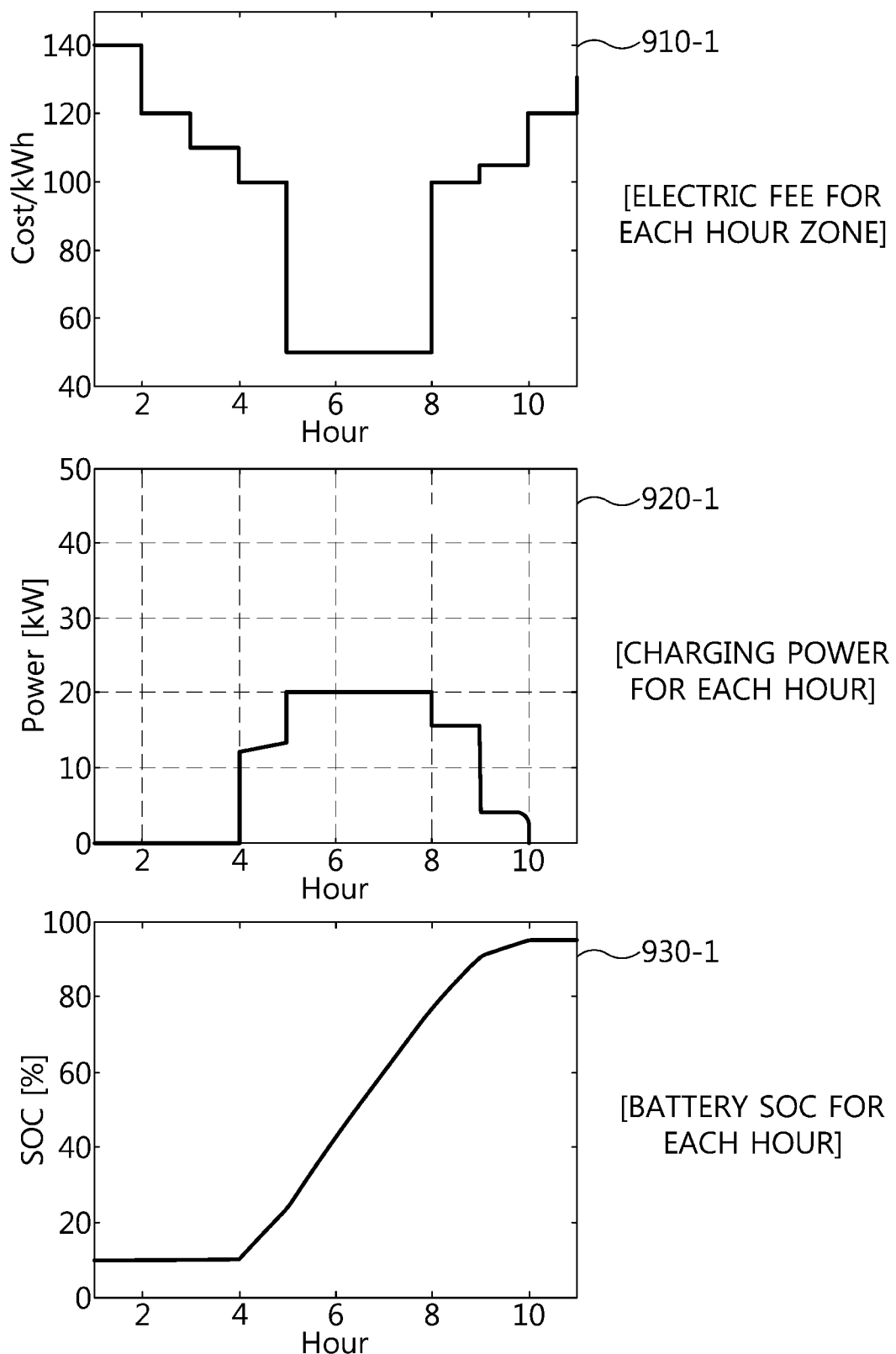
FIGS. 9A to 15 are examples illustrating the battery charging scheduling optimization upon subdividing the power rate for each hour zone in accordance with an exemplary embodiment of the present disclosure.

FIG. 9A is an example illustrating battery charging scheduling optimization upon subdividing the power rate for each hour zone in accordance with an embodiment of the disclosure. The power rate (i.e., the electric fee) for each hour zone is as follows.

TABLE 1

| Hour | 1 | 2 | 3 | 4 | 5 | 6 | 7 | 8 | 9 | 10 | 11 |
|---|---|---|---|---|---|---|---|---|---|---|---|
| Cost/kwh | 140 | 120 | 110 | 100 | 50 | 50 | 50 | 100 | 105 | 120 | 130 |

The inputs of the charging start SOC, the target SOC, the charging start hour, the charging completion hour, the maximum power, etc. are as follows.

TABLE 2

| Start SOC | 10% | Target SOC | 95% | Charging start hour | 1 | Charging completion hour | 11 | Maximum power | 20 kw |
|---|---|---|---|---|---|---|---|---|---|

According to the above results, the charging may be performed based on the power rate for each hour zone during about 4-10 hours, the charging is performed during about 9-10 hours to increase the battery efficiency ($=V_{ocx}I_{out}/V_{out}I_{out}$), and the 95% charging is completed before 11 hour that is the ending hour. Accordingly, an electric fee graph for each hour zone 910-1, a charging power graph for each hour 920-1, and a battery SOC graph for each hour 930-1 are illustrated.

Figure 9B:
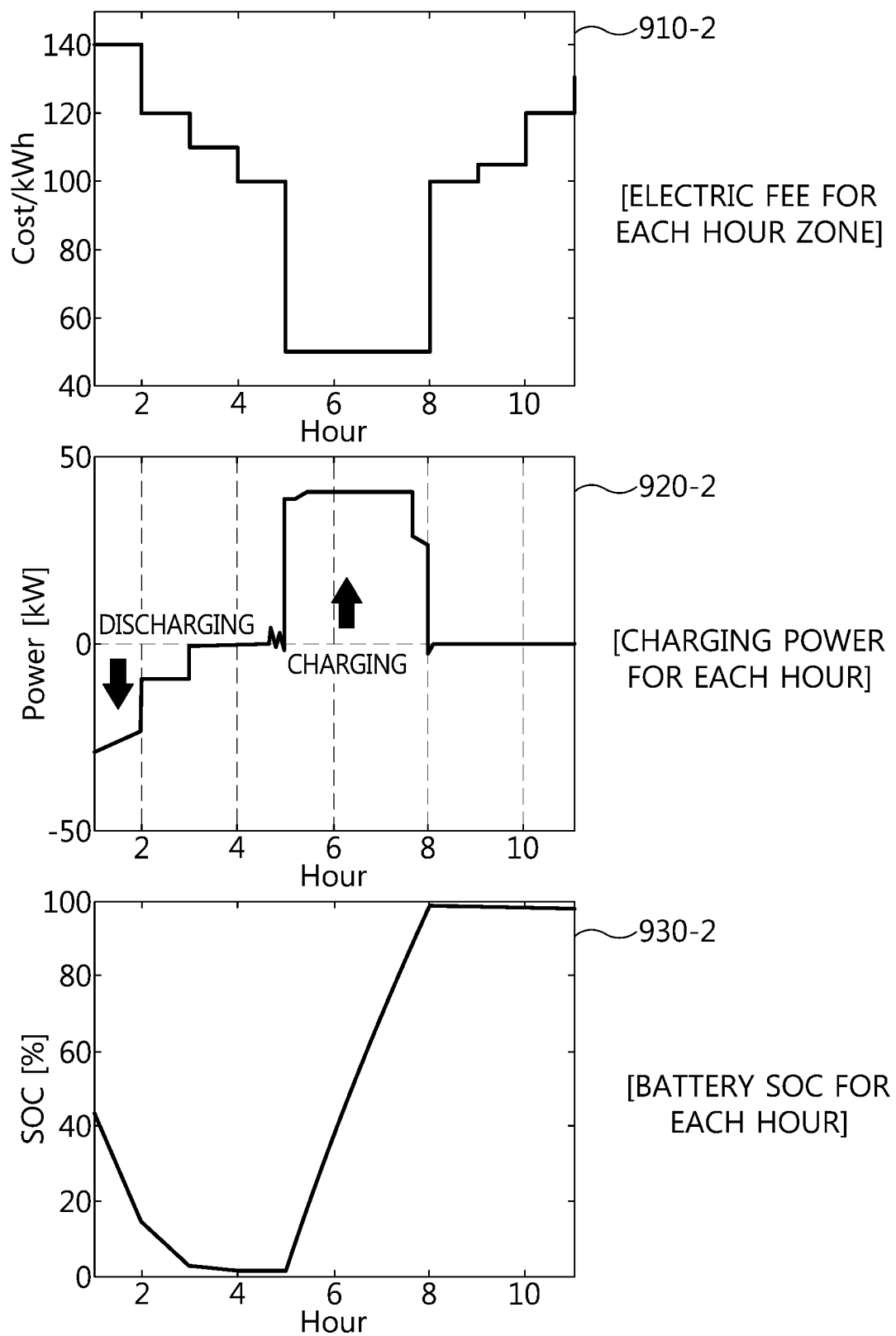

FIG. 9B is an example illustrating battery charging scheduling optimization upon subdividing the power rate for each hour zone in accordance with another exemplary embodiment of the present disclosure. The power rate (i.e., the electric fee) for each hour zone are as follows.

TABLE 3

| Hour | 1 | 2 | 3 | 4 | 5 | 6 | 7 | 8 | 9 | 10 | 11 |
|---|---|---|---|---|---|---|---|---|---|---|---|
| Cost/kwh (charging) | 140 | 120 | 110 | 100 | 50 | 50 | 50 | 100 | 105 | 120 | 130 |
| Cost/kwh (discharging) | −140 | −120 | −110 | −100 | −50 | −50 | −50 | −100 | −105 | −120 | −130 |

The inputs of the charging start SOC, the target SOC, the charging start hour, the charging completion hour, the maximum charging power, the maximum discharging power, etc. are as follows.

TABLE 4

| Start SOC | 45% | Target SOC | 95% | Charging start hour | 1 | Charging completion hour | 11 | Maximum charging power | 40 kw | Maximum discharging power | −40 kw |
|---|---|---|---|---|---|---|---|---|---|---|---|

Figure 10:
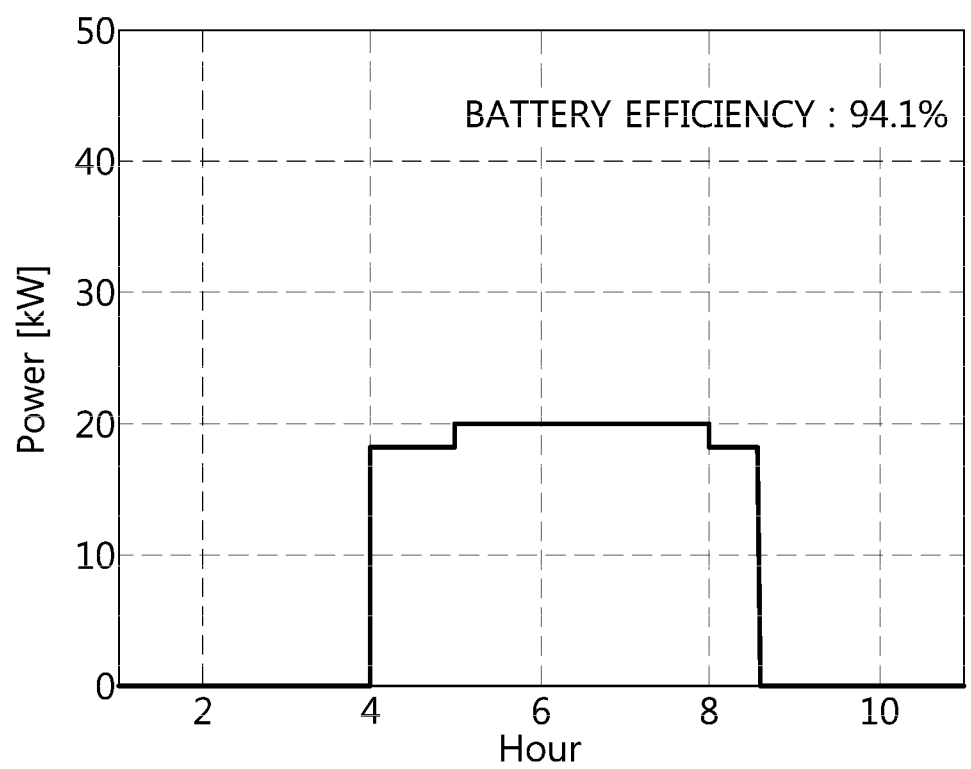

According to the above results, the battery energy discharging (e.g., SOC: 45%→0%) may be performed at the initial power high-cost hour zone (e.g., between 0 and 4 hours) to supply energy to the grid. That is, the power is sold. Meanwhile, the battery may be charged (e.g., SOC: 0%→95%) at a maximum power in a low-cost hour zone (e.g., between 5 and 8 hours). Accordingly, an electric fee graph for each hour zone 910-2, a charging power graph for each hour 920-2, and a battery SOC graph for each hour 930-2 are illustrated. FIG. 10 is a graph illustrating battery efficiency in accordance with FIG. 9A.

Figure 11:
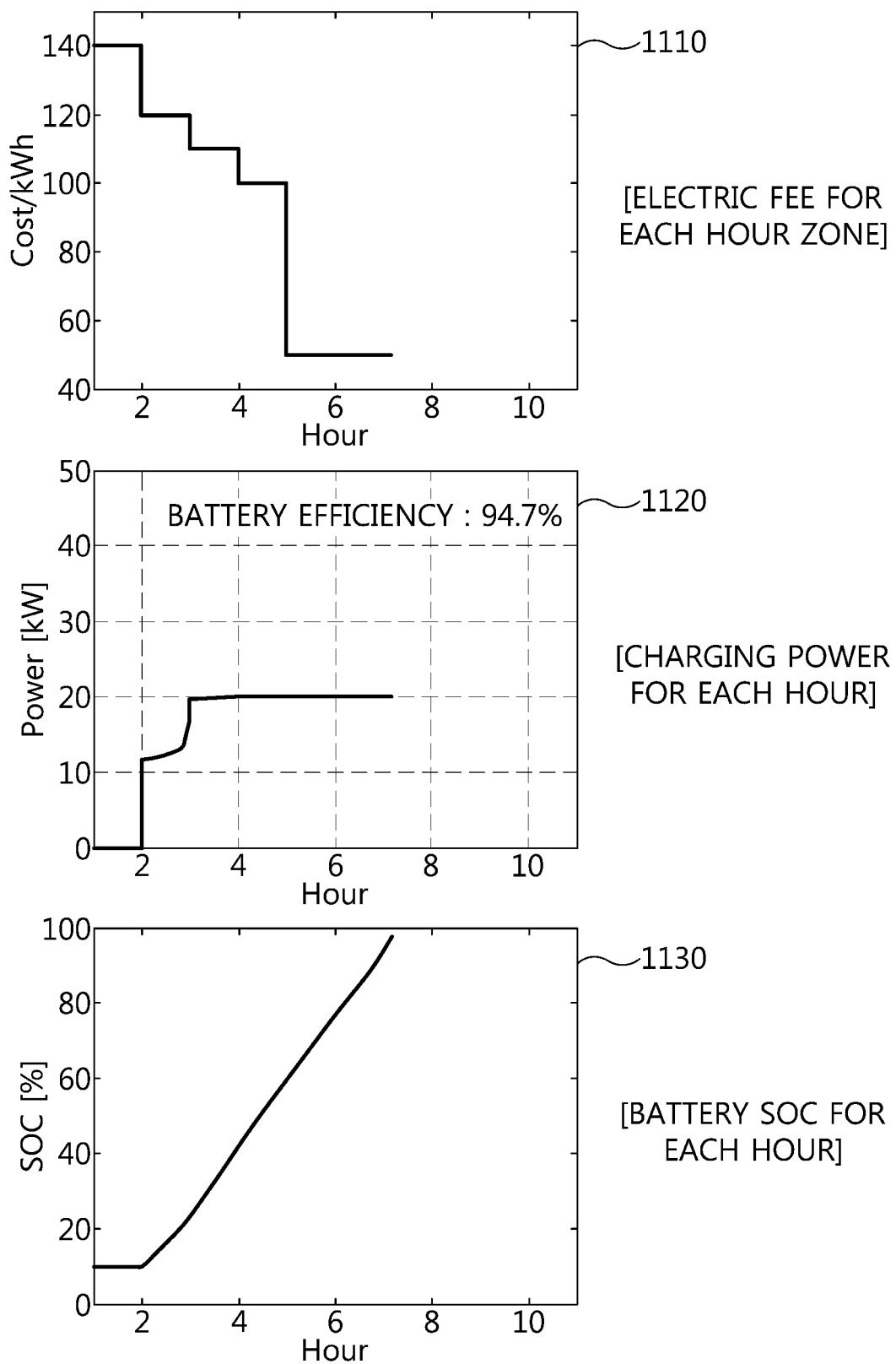

FIG. 11 is an example illustrating the battery charging scheduling optimization upon subdividing the power rate for each hour zone in accordance with an exemplary embodiment of the present disclosure. The power rate (i.e., the electric fee) for each hour zone is as in the above table, and the inputs of the charging start SOC, the target SOC, and the charging completion hour are as follows.

TABLE 5

| Start SOC | 10% | Target SOC | 95% | Charging start hour | 1 | Charging completion hour | 7 | Maximum power | 20 kw |
|---|---|---|---|---|---|---|---|---|---|

According to the above results, the early charging scheduling is changed from about 4-10 to about 2-7 hour zone to satisfy the SOC 95% charging. Accordingly, an electric fee graph for each hour zone 1110, a charging power graph for each hour 1120, and a battery SOC graph for each hour 1130 are illustrated.

Figure 12:
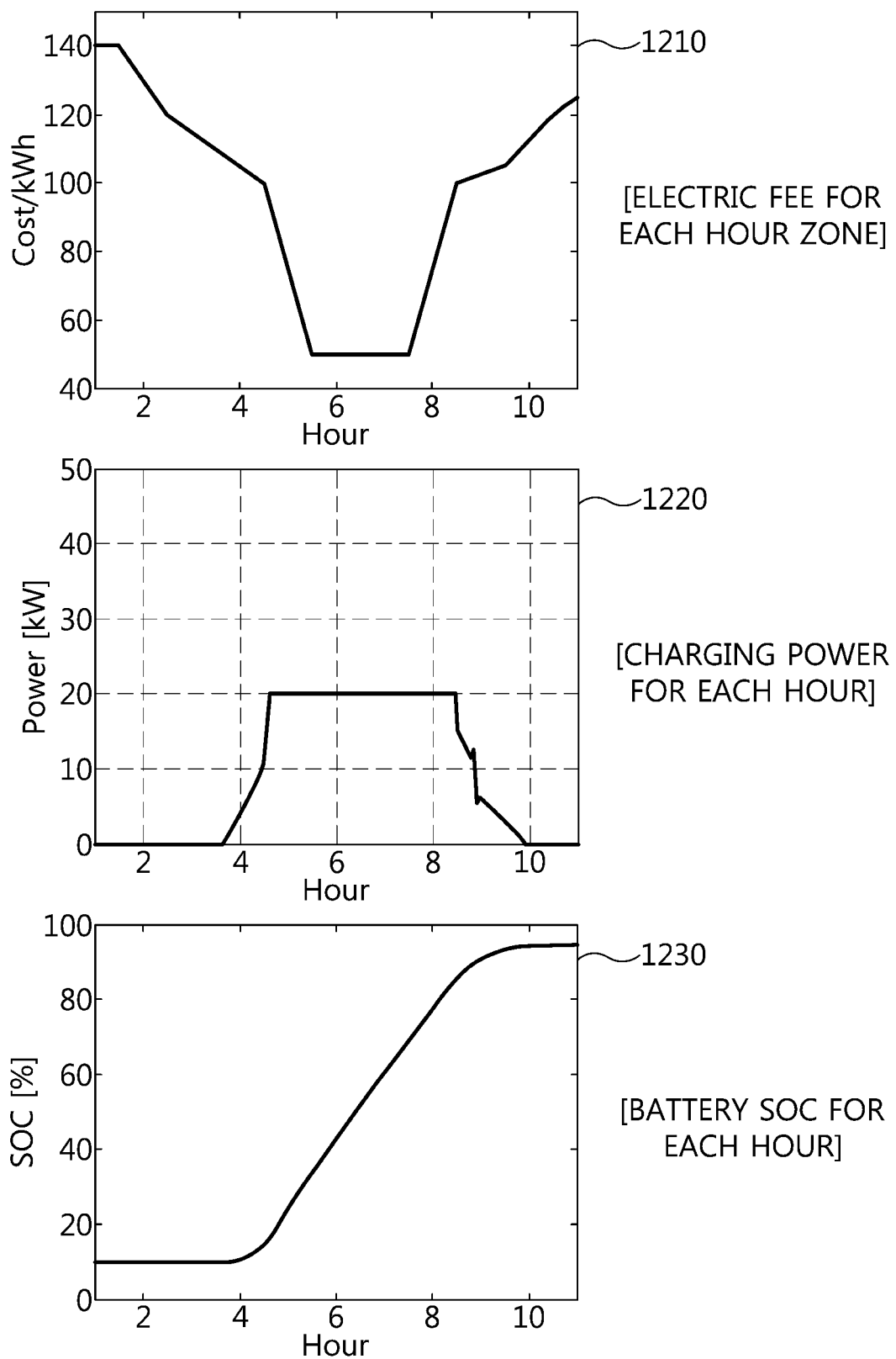

FIG. 12 is an example illustrating battery charging scheduling optimization upon subdividing the power rate for each hour zone in accordance with an exemplary embodiment of the present disclosure. That is, it is an example illustrating by minute. The power rate (i.e., the electric fee) for each hour zone is as in Table 1, and the inputs of the charging start SOC, the target SOC, and the charging completion hour are as in Table 2. According to the above results, the battery is charged with continuous power depending upon the change in the power rate between 4 and 10 hour zone. Accordingly, an electric fee graph for each hour zone 1210, a charging power graph for each hour 1220, and a battery SOC graph for each hour 1230 are illustrated.

Figure 13:
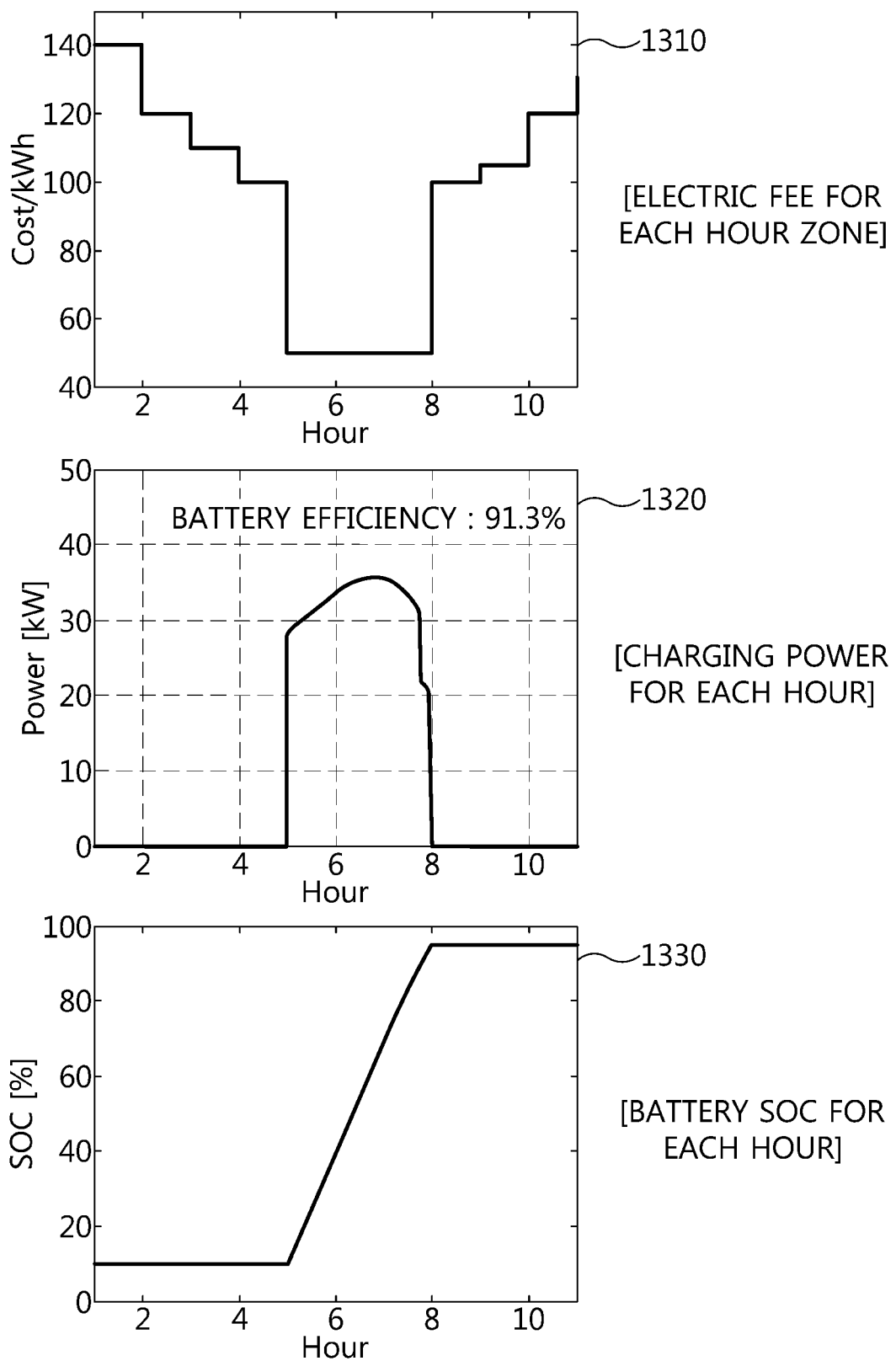

FIG. 13 is an example illustrating battery charging scheduling optimization upon subdividing the power rate for each hour zone in accordance with an exemplary embodiment of the present disclosure. The power rate (i.e., the electric fee) for each hour zone is as in Table 1, and the charging start SOC, the target SOC, and the charging completion hour are as follows.

TABLE 6

| Start SOC | 10% | Target SOC | 95% | Charging start hour | 1 | Charging completion hour | 11 | Maximum power | 40 kw |
|---|---|---|---|---|---|---|---|---|---|

Figure 14:
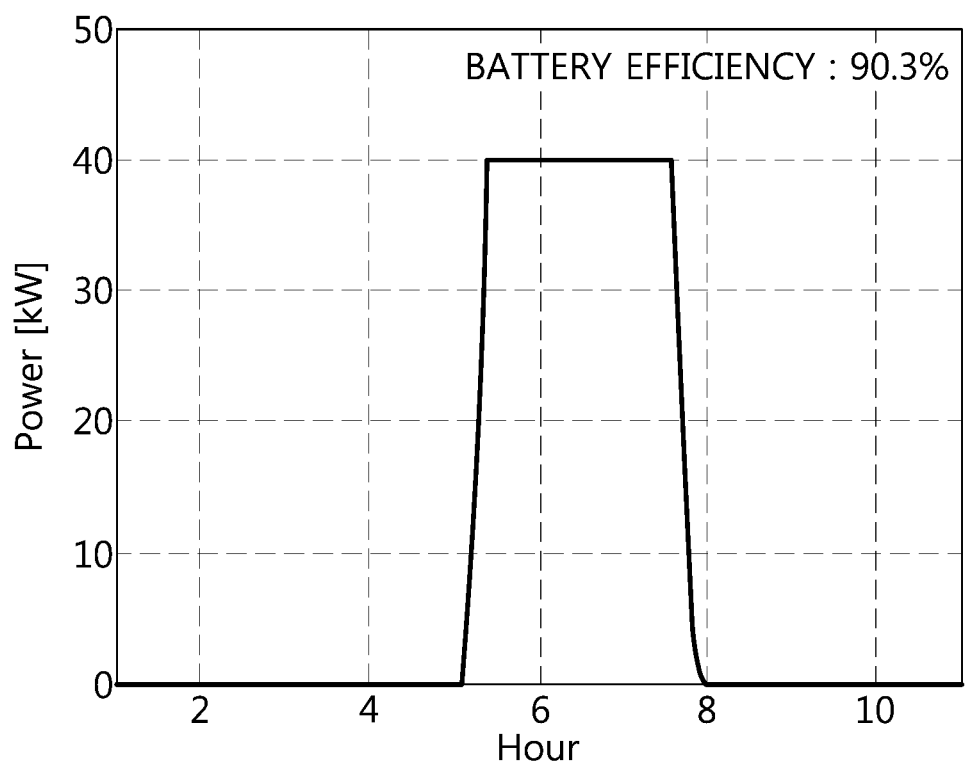

According to the above results, the charging scheduling is changed from about 4-10 to about 5-8 hour zone, which is the lowest power rate zone. The maximum power is 40 kW, but the charging is performed in the region of 40 kW or less to enhance battery efficiency. Accordingly, an electric fee graph for each hour zone 1310, a charging power graph for each hour 1320, and a battery SOC graph for each hour 1330 are illustrated. FIG. 14 is a graph illustrating battery efficiency according to FIG. 13.

Figure 15:
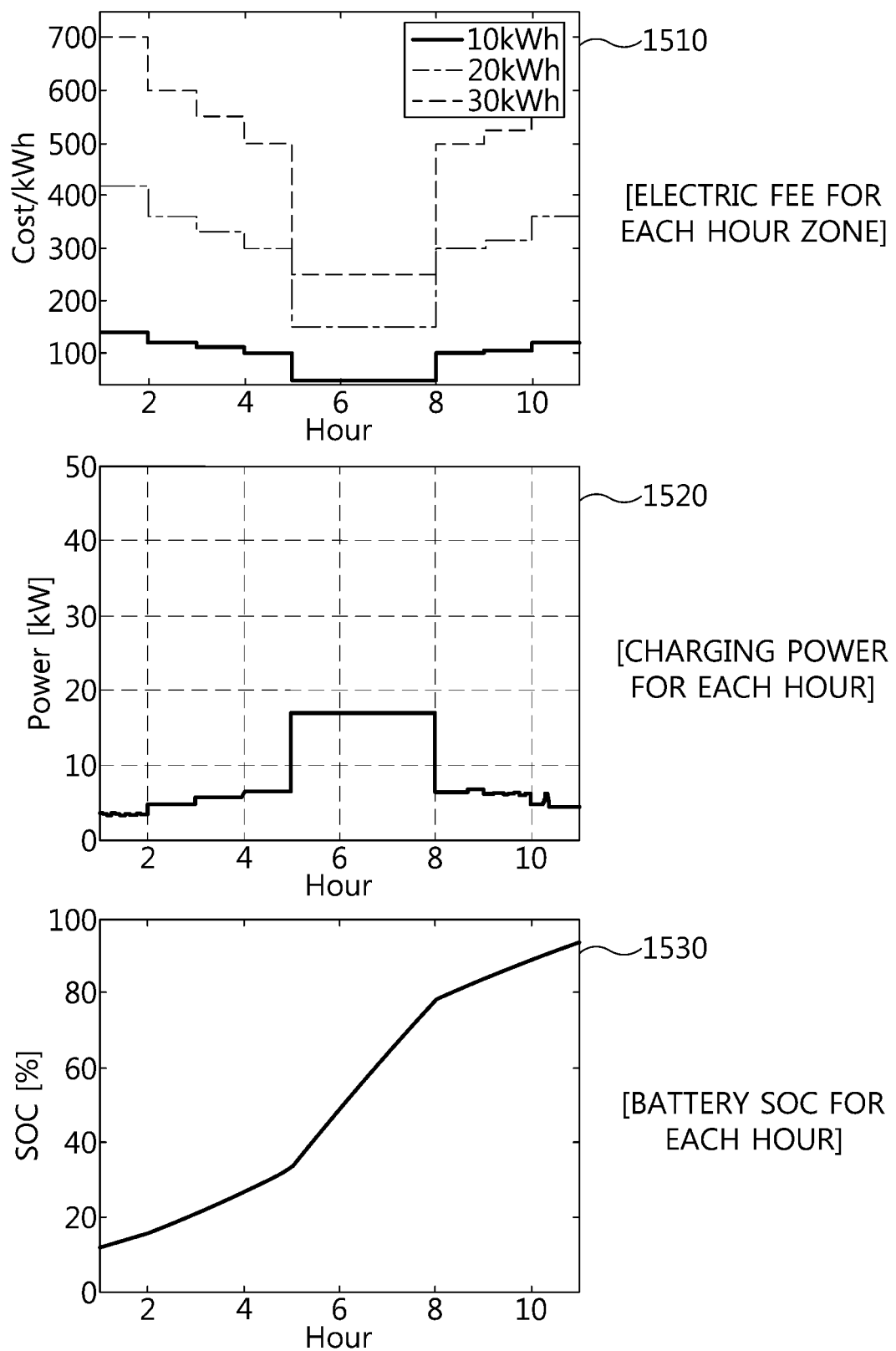

FIG. 15 is an example illustrating battery charging scheduling optimization upon subdividing the power rate for each hour zone in accordance with an exemplary embodiment of the present disclosure. That is, FIG. 15 illustrates a case in which an accumulative pricing of the power rate for each hour zone is applied. The power rate (i.e., the electric fee) for each hour zone is as follows.

TABLE 7

| Hour | 1 | 2 | 3 | 4 | 5 | 6 | 7 | 8 | 9 | 10 | 11 |
|---|---|---|---|---|---|---|---|---|---|---|---|
| 10 kwh | 140 | 120 | 110 | 100 | 50 | 50 | 50 | 100 | 105 | 120 | 130 |
| 20 kwh | 420 | 360 | 330 | 300 | 150 | 150 | 150 | 300 | 315 | 360 | 390 |
| 30 kwh | 700 | 600 | 550 | 500 | 250 | 250 | 250 | 500 | 525 | 600 | 650 |

The inputs of the charging start SOC, the target SOC, and the charging completion hour are as in the above table.

According to the above result, the charging scheduling may be changed by averaging the power by changing from the charging hour zone about 5-8 to about 0-11 hour zone to avoid the power accumulative pricing. Accordingly, an electric fee graph for each hour zone 1510, a charging power graph for each hour 1520, and a battery SOC graph for each hour 1530 are illustrated.

In addition, the steps of the method or the algorithm explained regarding the exemplary embodiments disclosed herein are implemented as a program command format that may be performed through various computers means to be recorded in a non-transitory computer readable medium. The non-transitory computer readable medium may include a program (command) code, a data file, a data structure, etc., separately or in a combination thereof.

The program (command) code recorded in the medium may be the ones specially designed or configured for the present disclosure, or can be the one known and available to those skilled in the computer software. Examples of the non-transitory computer readable medium can include a magnetic media such as a hard disk, a floppy disk, and a magnetic tape, an optical media such as a CD-ROM, a DVD, and a Blue ray, and a semiconductor storage device specially configured to store and perform a program (command) code such as a ROM, a RAM, and a flash memory.

Herein, examples of the program (command) code include a high-level language code that may be executed by a computer using an interpreter, etc., as well as a machine language code made such as those produced by a complier. The hardware device may be configured to operate as one or more software modules in order to perform the operation of the present disclosure, and vice versa.

What is claimed is:

1. An electric vehicle reservation charging system, comprising:
 a communication controller configured to receive charging and discharging reservation setting information and power rate information;
 a vehicle controller configured to determine a preset charging profile based on an entry of a preset minimum cost charging mode using the charging and discharging reservation setting information and the power rate information, and perform a charging state control based on an optimal charging state profile and an optimal charging power profile that are preset based on the charging profile; and a charger configured to perform a power control for charging or discharging to correspond to a target charging discharging power command determined by the charging state control, wherein the power rate information is a power rate for each hour zone, and the power control is varied for each hour zone during an entire charging section.

2. The electric vehicle reservation charging system of claim 1, wherein the charging profile is a first charging profile that is preset based on the entry of the preset minimum cost charging mode or a second charging profile determined using a preset dynamic programming method when there is no the first charging profile.

3. The electric vehicle reservation charging system of claim 1, wherein the charging reservation setting information includes a target charging amount, a reservation charging completion hour, and a charging mode.

4. The electric vehicle reservation charging system of claim 1, wherein the power control controls a voltage and a current to correspond to the optimal charging state profile.

5. The electric vehicle reservation charging system of claim 1, wherein the optimal charging power profile is a map that indicates the relationship between the hour and the power, and the optimal charging state profile is a map that indicates the relationship between the hour and the charging state.

6. The electric vehicle reservation charging system of claim 2, wherein the first charging profile performs a user condition charging control that is set by the user or a general charging control when it is not the entry of the minimum cost charging mode.

7. The electric vehicle reservation charging system of claim 1, wherein the vehicle controller is configured to determine the charging profile again when the power rate information is changed while the power control is executed.

8. The electric vehicle reservation charging system of claim 2, wherein the second charging profile is generated using, a power rate map including a rate for the power amount for each hour zone based on the power rate information; charging constraint condition information including a start charging state, a target charging state, a charging start hour, a charging completion hour, and a system maximum charging power, based on the power rate map; and a power search grid information generated to satisfy the charging constraint condition information and forming a grid at an arbitrary interval of the start charging state and the target charging state, an arbitrary interval of the charging start hour and the charging completion hour, and an arbitrary interval of the system maximum charging and 0 kw.

9. The electric vehicle reservation charging system of claim 2, wherein the second charging profile is generated using, a power rate map including a rate for the power amount for each hour zone based on the power rate information; charging constraint condition information including a start charging state, a target charging state, a charging start hour, a charging completion hour, and a system maximum charging power, based on the power rate map; and a power search grid information generated to satisfy the charging constraint condition information and forming a grid at an arbitrary interval of the start charging state and the target charging state, an arbitrary interval of the charging start hour and the charging completion hour, and an arbitrary interval of the system maximum charging and the system maximum discharging.

10. The electric vehicle reservation charging system of claim 9, wherein the system maximum charging power reflects the characteristic of at least one of a battery, a charging device, and a charger.

11. The electric vehicle reservation charging system of claim 2, wherein the second charging profile generates as an intermediate map by calculating each hour and a charging cost in the charging state in a backward method from the last hour, and is calculated by a forward method using the intermediate map.

12. The electric vehicle reservation charging system of claim 2, wherein the second charging profile is acquired using the intermediate map stored for each grid in each charging state that is acquired in a backward method from the last hour.

13. An electric vehicle reservation charging system, comprising:

a communication controller configured to receive charging and discharging reservation setting information and power rate information;

a vehicle controller configured to determine a preset charging profile based on an entry of a preset minimum cost charging mode using the charging and discharging reservation setting information and the power rate information, and generate the charging profile; and a charger configured to perform a charging state control based on an optimal charging state profile and an optimal charging power profile that are preset based on the charging profile, and perform a power control for charging and discharging to correspond to a target charging discharging power command determined by the charging state control, wherein the power rate information is a power rate for each hour zone, and the power control is varied for each hour zone during an entire charging section.

14. An electric vehicle reservation charging method, comprising:

receiving, by a communication controller, charging and discharging reservation setting information and power rate information;

determining, by a vehicle controller, a preset charging profile based on an entry of a preset minimum cost charging mode using the charging and discharging reservation setting information and the power rate information, and performing a charging state control based on an optimal charging state profile and an optimal charging power profile that are preset based on the charging profile; and performing, by a charger, a power control for charging or discharging to correspond to a target charging discharging power command determined by the charging state control, wherein the power rate information is a power rate for each hour zone, and the power control is varied for each hour zone during an entire charging section.

15. An electric vehicle reservation charging method, comprising:

receiving, by a communication controller, charging and discharging reservation setting information and power rate information;

determining, by a vehicle controller, a preset charging profile based on an entry of a preset minimum cost charging mode using the charging and discharging reservation setting information and the power rate information, and generating the charging profile; and performing, by a charger, a charging state control based on an optimal charging state profile and an optimal charging power profile that are preset based on the charging profile, and performing a power control for charging or discharging to correspond to a target charging discharging power command determined by the charging state control,
wherein the power rate information is a power rate for each hour zone, and the power control is varied for each hour zone during an entire charging section.

\* \* \* \* \*